(12) United States Patent
Noonan

(10) Patent No.: US 10,953,902 B2
(45) Date of Patent: Mar. 23, 2021

(54) RECONFIGURABLE CARTS FOR LOADING, TRANSPORTING, AND/OR DISPENSING MATERIALS

(71) Applicant: Mark Noonan, New Canaan, CT (US)

(72) Inventor: Mark Noonan, New Canaan, CT (US)

( * ) Notice: Subject to any disclaimer, the term of this patent is extended or adjusted under 35 U.S.C. 154(b) by 0 days.

(21) Appl. No.: 15/705,686

(22) Filed: Sep. 15, 2017

(65) Prior Publication Data

US 2018/0009455 A1    Jan. 11, 2018

Related U.S. Application Data

(63) Continuation of application No. PCT/US2016/022306, filed on Mar. 14, 2016.

(Continued)

(51) Int. Cl.
*B62B 1/12* (2006.01)
*B62B 5/06* (2006.01)
(Continued)

(52) U.S. Cl.
CPC ............... *B62B 1/147* (2013.01); *B62B 1/12* (2013.01); *B62B 1/14* (2013.01); *B62B 1/204* (2013.01);
(Continued)

(58) Field of Classification Search
CPC .... B62B 1/18; B62B 1/20; B62B 1/24; B62B 1/12; B62B 1/147; B62B 1/204;
(Continued)

(56) References Cited

U.S. PATENT DOCUMENTS

| 887,874 A | * | 5/1908 | Toy | B62B 1/147 |
| | | | | 37/434 |
| 1,063,112 A | * | 5/1913 | Brand | B62B 1/24 |
| | | | | 298/3 |

(Continued)

FOREIGN PATENT DOCUMENTS

| FR | 57198 E | * 12/1952 | ............... B62B 1/20 |
| KR | 10-0880668 B1 | 1/2009 | |

(Continued)

OTHER PUBLICATIONS

International Search Report and Written Opinion for PCT application No. PCT/US2016/022306 filed Mar. 14, 2016 (published as WO 2016/149186 on Sep. 22, 2016) which is the parent application to the instant application, dated, Jun. 27, 2016, 20 pages.

*Primary Examiner* — Emma K Frick
(74) *Attorney, Agent, or Firm* — Emanus, LLC; Willie Jacques

(57) ABSTRACT

A cart generally includes a body, a wheel assembly, first and second handles, and a scoop. The body defines an interior usable for holding materials. The body includes a forward portion and a rearward portion. The wheel assembly includes at least one axle and first and second wheels. Each of the first and second handles includes a handle portion to allow a user to move the cart and a leg portion for contacting a support surface. The scoop is rotatable relative to the body between a plurality of positions including at least a forward position and a rearward position. In the forward position, the scoop is adjacent the forward portion of the body, whereby the scoop increases carrying capacity of the cart. In the rearward position, the scoop is disposed at least partially over and/or adjacent the rearward portion of the body.

16 Claims, 28 Drawing Sheets

Related U.S. Application Data

(60) Provisional application No. 62/133,960, filed on Mar. 16, 2015.

(51) Int. Cl.
  *B62B 1/14* (2006.01)
  *B62B 1/22* (2006.01)
  *B62B 1/26* (2006.01)
  *B62B 1/20* (2006.01)
  *B62B 1/00* (2006.01)
  *E01H 5/02* (2006.01)

(52) U.S. Cl.
  CPC .............. *B62B 1/22* (2013.01); *B62B 1/26* (2013.01); *B62B 5/063* (2013.01); *B62B 1/008* (2013.01); *B62B 2202/50* (2013.01); *B62B 2202/70* (2013.01); *B62B 2203/05* (2013.01); *E01H 5/02* (2013.01)

(58) Field of Classification Search
  CPC ..... B62B 1/202; B62B 1/208; B62B 2203/70; B62B 3/02; E01H 5/02
  See application file for complete search history.

(56) References Cited

U.S. PATENT DOCUMENTS

| | | | | |
|---|---|---|---|---|
| 1,307,568 | A * | 6/1919 | Wenndorf | E02F 3/8816 37/304 |
| 1,804,404 | A * | 5/1931 | Dowling | B62B 1/24 37/434 |
| 2,461,353 | A * | 2/1949 | Stelzer | B62B 1/147 280/30 |
| 2,544,505 | A * | 3/1951 | Kronhaus | B62B 1/24 414/554 |
| 2,805,885 | A * | 9/1957 | Elzea | B62B 1/20 296/36 |
| 2,852,873 | A * | 9/1958 | Benz | A01B 1/02 294/181 |
| 2,895,238 | A * | 7/1959 | Long | A01B 1/02 37/434 |
| 2,930,152 | A * | 3/1960 | Pipkin | B62B 1/147 280/645 |
| 2,938,748 | A * | 5/1960 | Johnson | B62B 1/12 248/129 |
| 3,021,625 | A * | 2/1962 | Stasse | B62B 1/24 37/434 |
| 3,106,303 | A * | 10/1963 | Finocchiaro | B62B 1/147 414/537 |
| 3,242,598 | A * | 3/1966 | Wright | B62B 1/12 37/434 |
| 4,130,953 | A * | 12/1978 | Bruno | E01H 5/02 280/47.26 |
| 4,161,073 | A * | 7/1979 | Oakes | E01H 5/02 280/47.24 |
| 4,503,661 | A * | 3/1985 | Potter | A01D 51/00 56/16.6 |
| 4,758,010 | A * | 7/1988 | Christie | B62B 1/206 280/47.18 |
| 4,921,305 | A * | 5/1990 | Steer | B62B 1/22 280/47.31 |
| 5,018,282 | A * | 5/1991 | Hong | B62B 1/147 37/265 |
| 5,074,064 | A * | 12/1991 | Nickels | E01H 5/02 37/265 |
| 5,123,187 | A * | 6/1992 | Zamaria | B62B 1/147 280/47.21 |
| 6,219,944 | B1 * | 4/2001 | Byers | B62B 1/147 37/265 |
| 6,523,839 | B2 * | 2/2003 | Simmons | B62B 1/147 280/47.26 |
| 2005/0212238 | A1 * | 9/2005 | Conley | B25H 1/04 280/47.32 |
| 2006/0022474 | A1 * | 2/2006 | Lachance | A01B 1/022 294/54.5 |
| 2007/0052187 | A1 | 3/2007 | Browder | |
| 2007/0164526 | A1 * | 7/2007 | Martini | B62B 1/24 280/47.26 |
| 2007/0176380 | A1 * | 8/2007 | Crutcher | B62B 1/14 280/47.23 |
| 2009/0058047 | A1 * | 3/2009 | Brosh | B62B 1/12 280/653 |
| 2010/0116960 | A1 * | 5/2010 | Lusk | B62B 5/00 248/314 |
| 2018/0257686 | A1 * | 9/2018 | Paino | B62B 1/26 |

FOREIGN PATENT DOCUMENTS

| | | | | |
|---|---|---|---|---|
| WO | WO-9429157 A1 * | 12/1994 | | B62B 1/20 |
| WO | WO-2005081844 A2 | 9/2005 | | |

\* cited by examiner

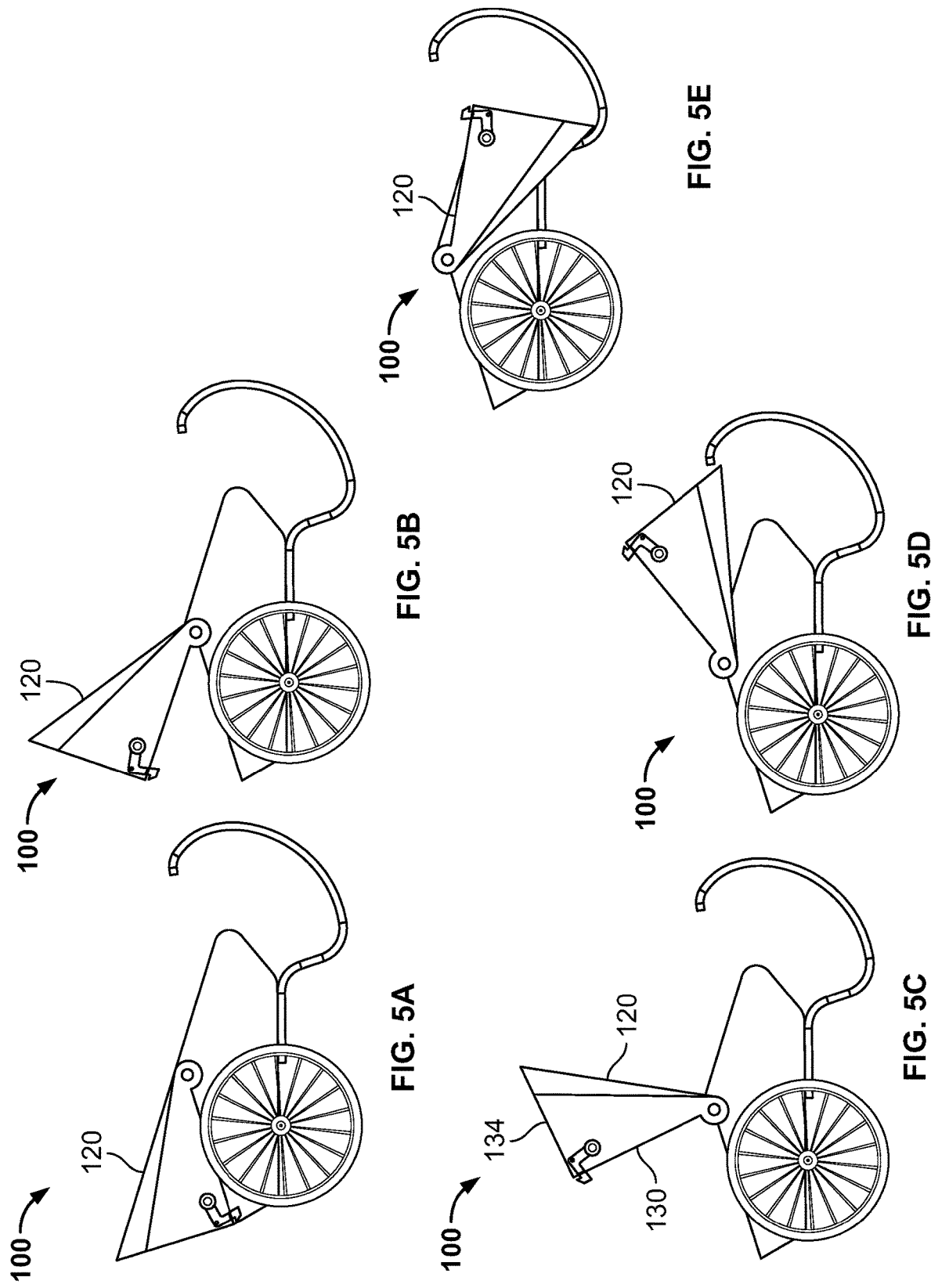

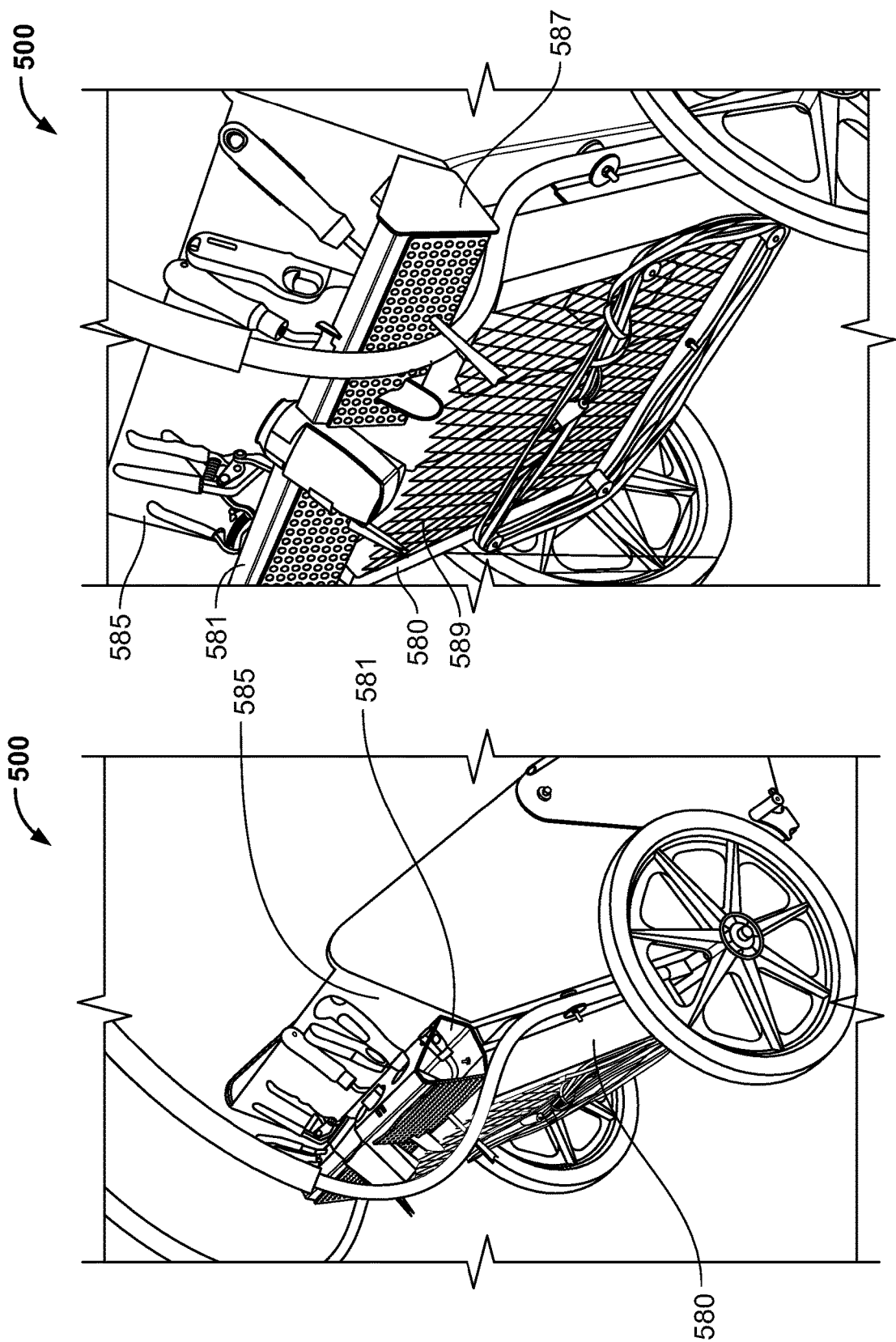

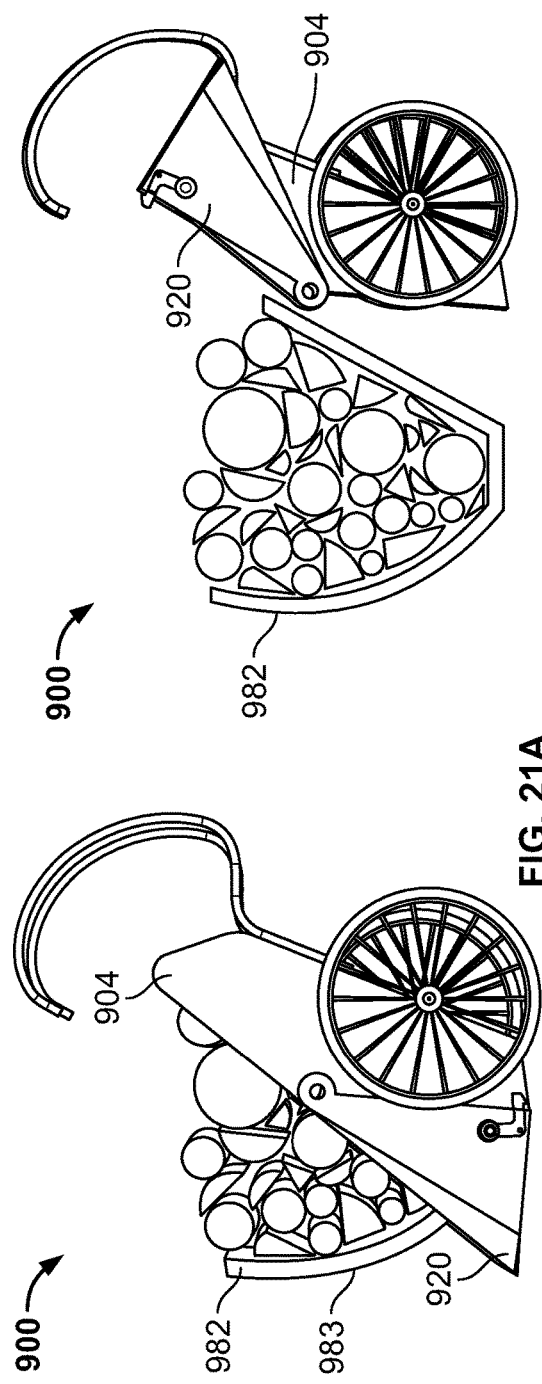
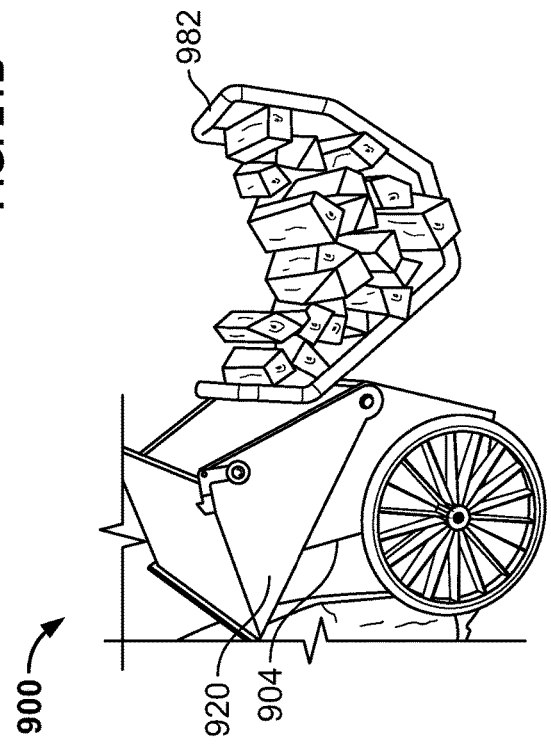
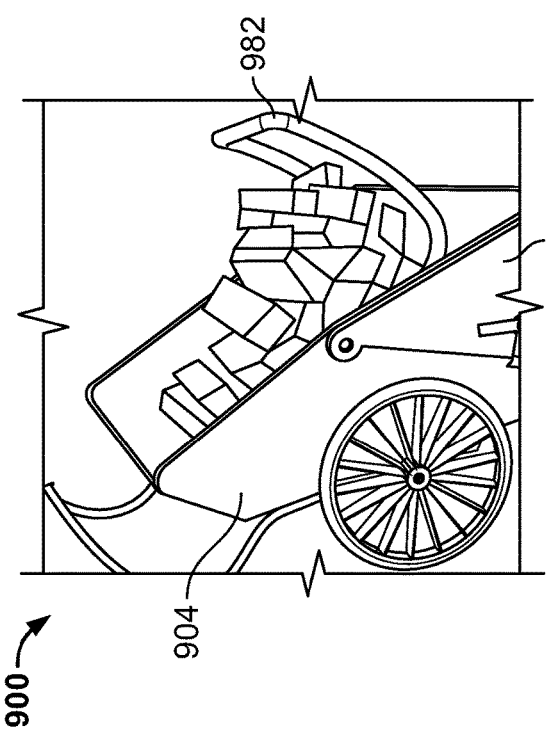

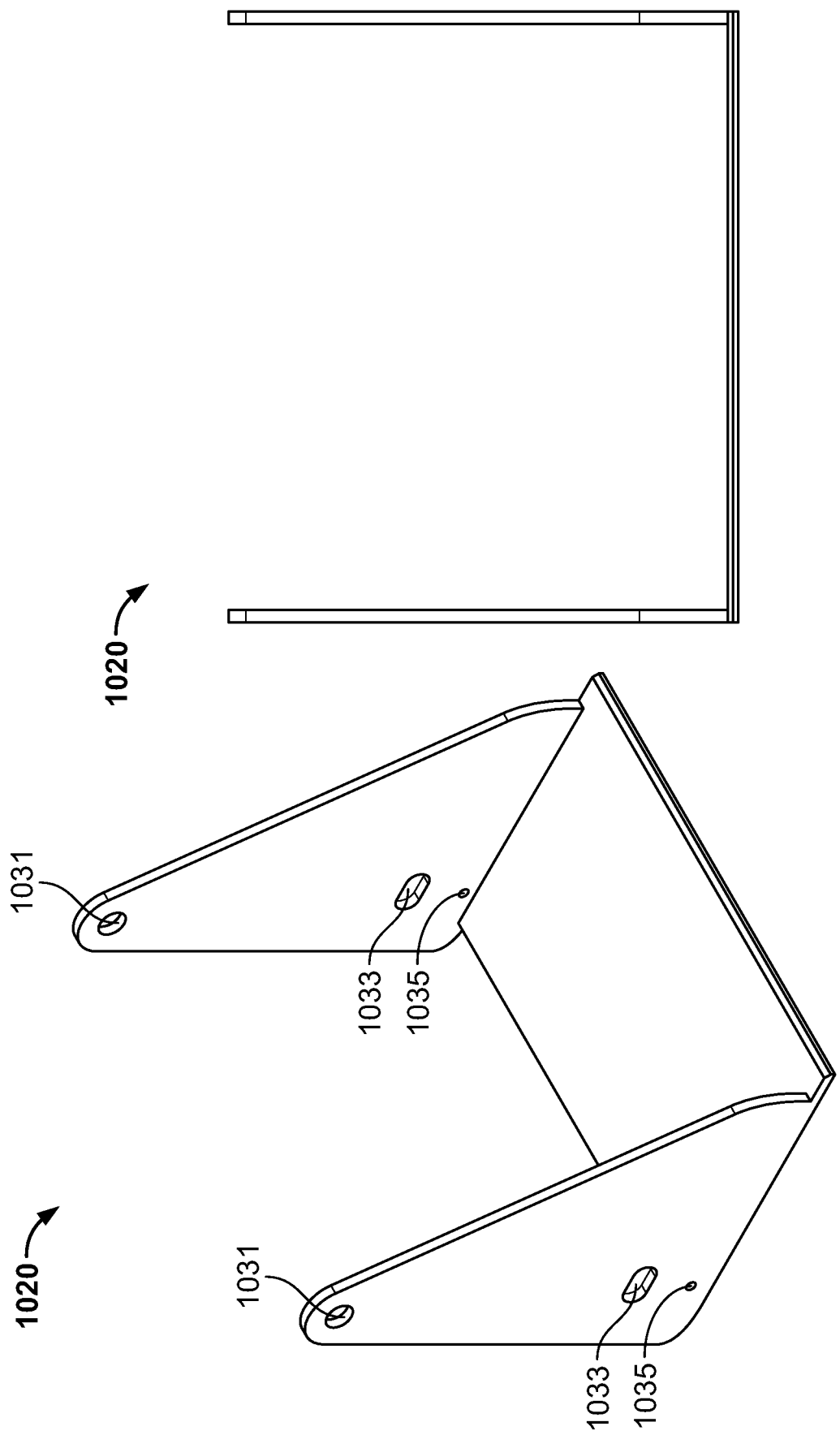

RECONFIGURABLE CARTS FOR LOADING, TRANSPORTING, AND/OR DISPENSING MATERIALS

CROSS-REFERENCE TO RELATED APPLICATIONS

This application is a U.S. Continuation of PCT International Application No. PCT/US2016/022306 filed Mar. 14, 2016 (published as WO 2016/149186 on Sep. 22, 2016), which claims the benefit of and priority to U.S. Provisional Patent Application No. 62/133,960 filed Mar. 16, 2015. The entire disclosures of the above applications are incorporated herein by reference.

FIELD

The present disclosure generally relates to a reconfigurable carts and methods for loading, transporting, and/or dispensing materials, such as yard or garden materials, firewood, and other materials.

BACKGROUND

This section provides background information related to the present disclosure which is not necessarily prior art.

Most wheelbarrows and garden carts (as well as hand trucks) are designed with a fixed shape or configuration. For example, it is not usually possible to change the configuration or shape/profile of a conventional garden cart.

DRAWINGS

The drawings described herein are for illustrative purposes only of selected embodiments and not all possible implementations, and are not intended to limit the scope of the present disclosure.

Figure 1A:
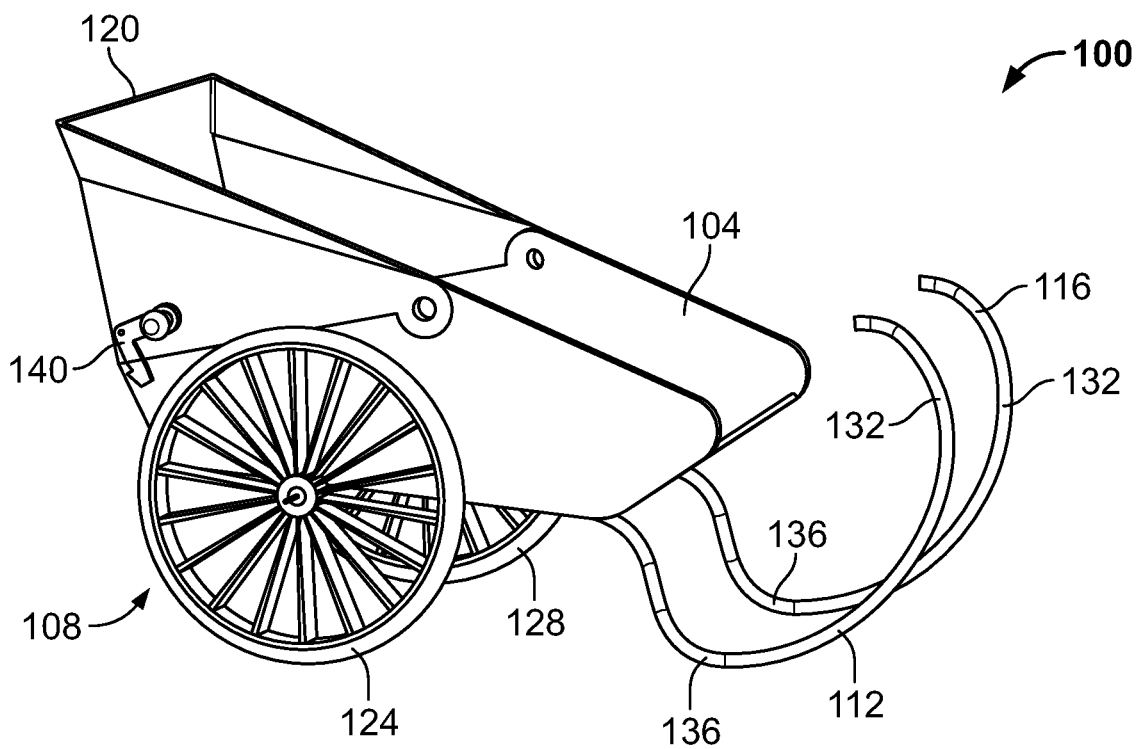
FIGS. 1A and 1B are perspective views of a cart according to exemplary embodiments in which the cart includes a rotatable scoop or nose (broadly, rotatable portion, section, or assembly).

FIGS. 5A through 5E include a sequence of side profiles of the cart shown in FIG. 1A with the scoop in various positions as the scoop is being rotated from the forward or scooping position (FIG. 5A) to the rearward, fully retracted, or stored position (FIG. 5E).

Figure 1B:
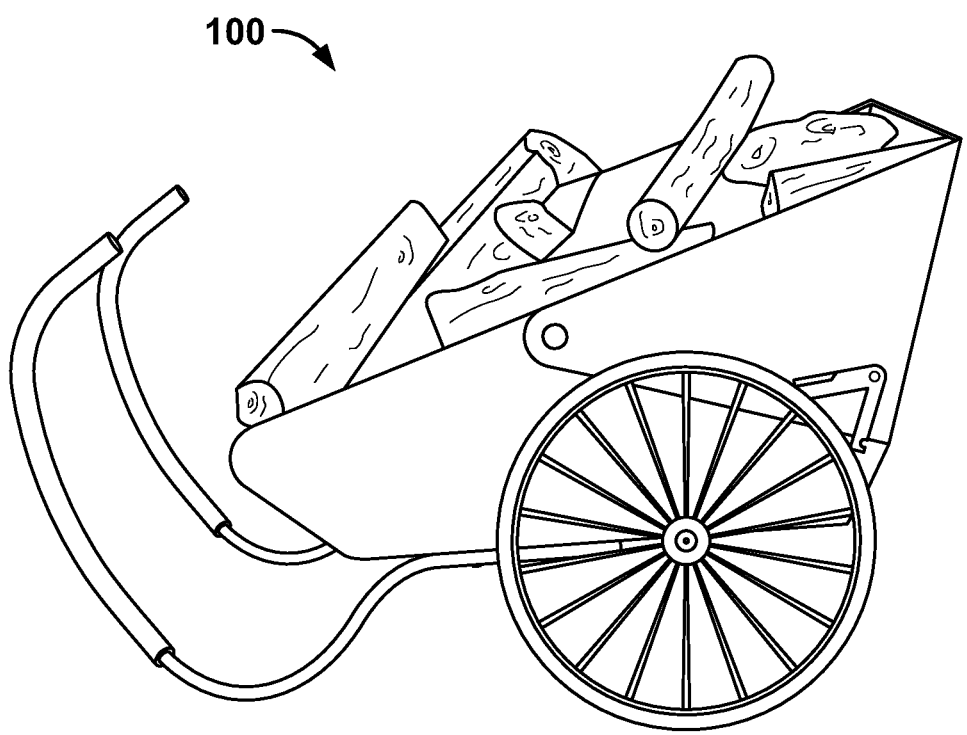
Figure 6A:
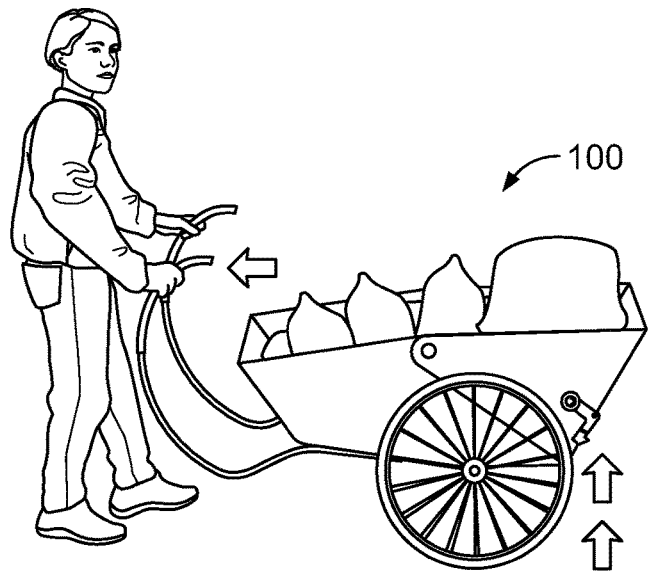
Figure 6B:
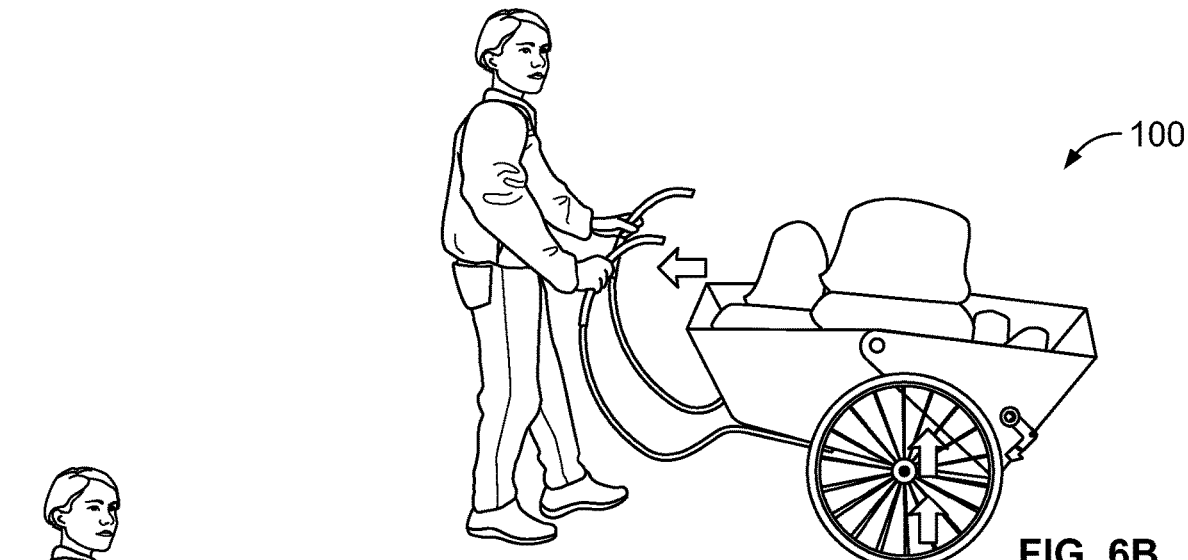
Figure 6C:
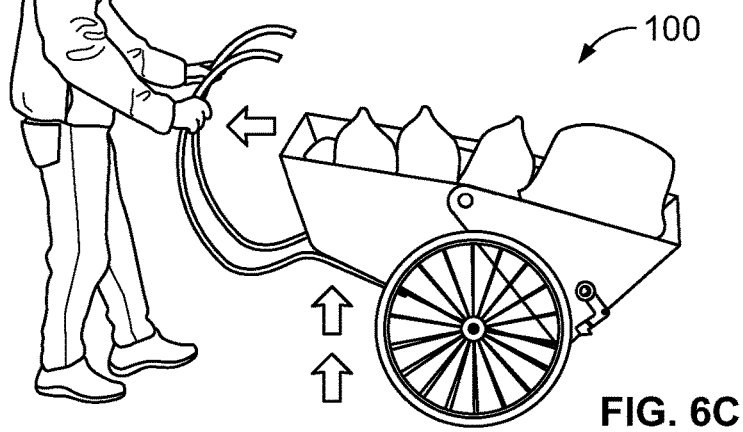

FIGS. 6A, 6B, and 6C are perspective views of the cart shown in FIG. 1B where additional weight has been added to three different locations in the cart, i.e., the front, middle, and back of the cart.

Figure 7A:
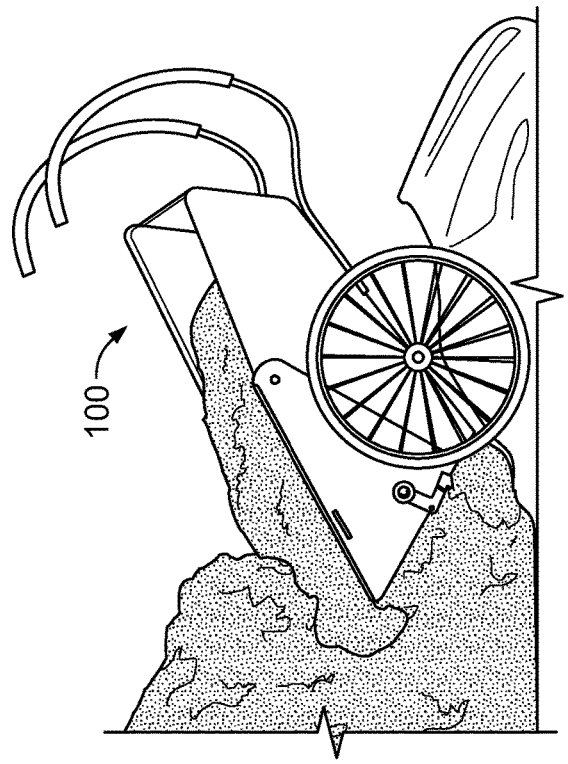
Figure 7B:
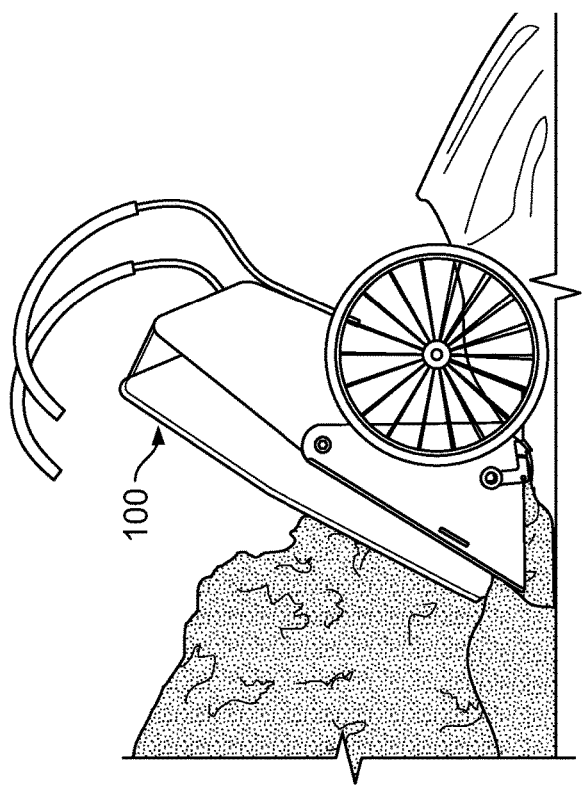
Figure 7C:
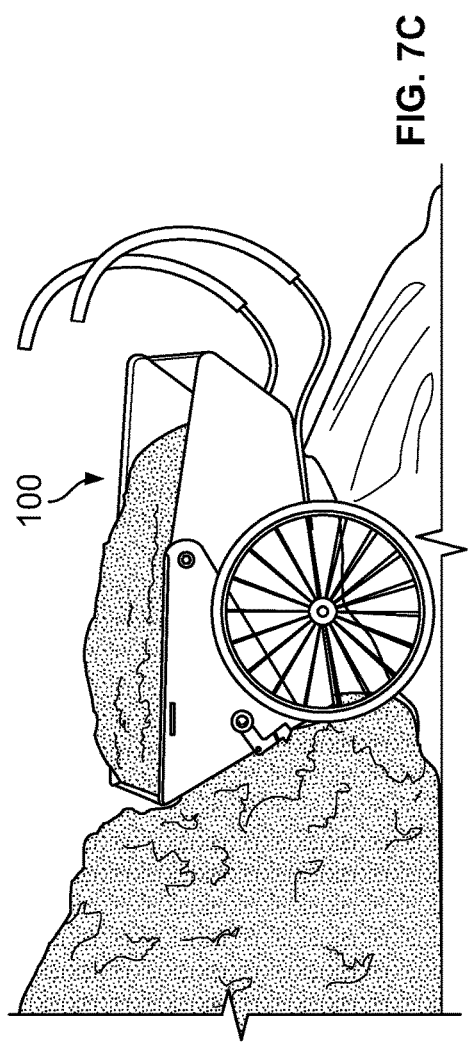

FIGS. 7A, 7B, and 7C are perspective views of the cart shown in FIG. 1B being used to transport a loose material.

FIGS. 8A through 8D are perspective views of the cart shown in FIG. 1B being used to scoop material into the cart without shoveling.

Figure 2A:
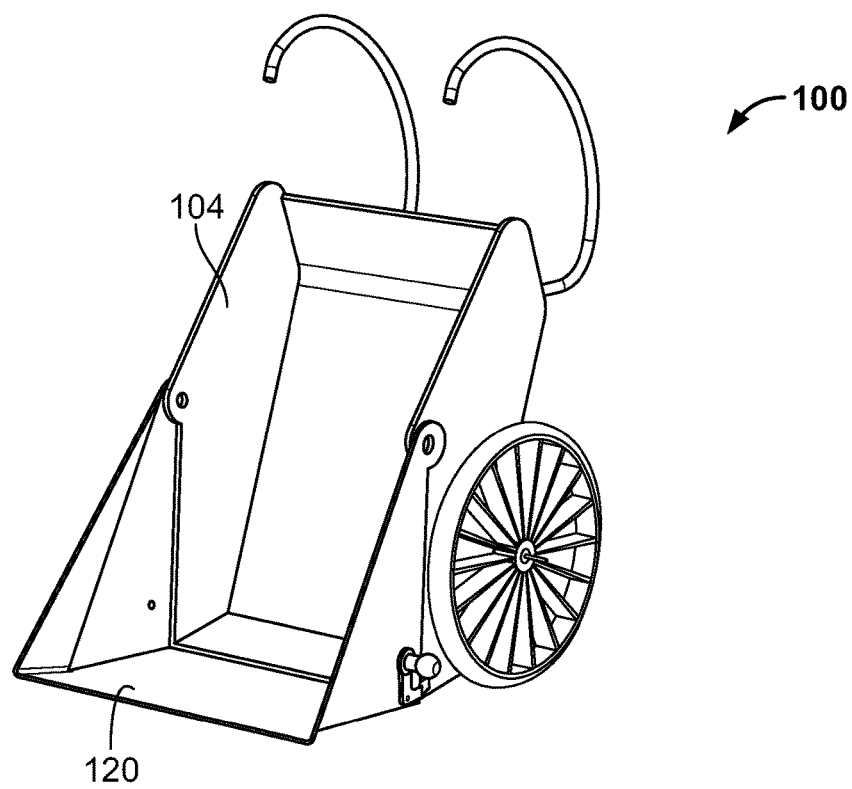
FIGS. 2A and 2B are perspective views of the cart shown in FIGS. 1A and 1B after the cart has been tipped forward such that the cart is in a scooping, loading, or unloading configuration.
Figure 2B:
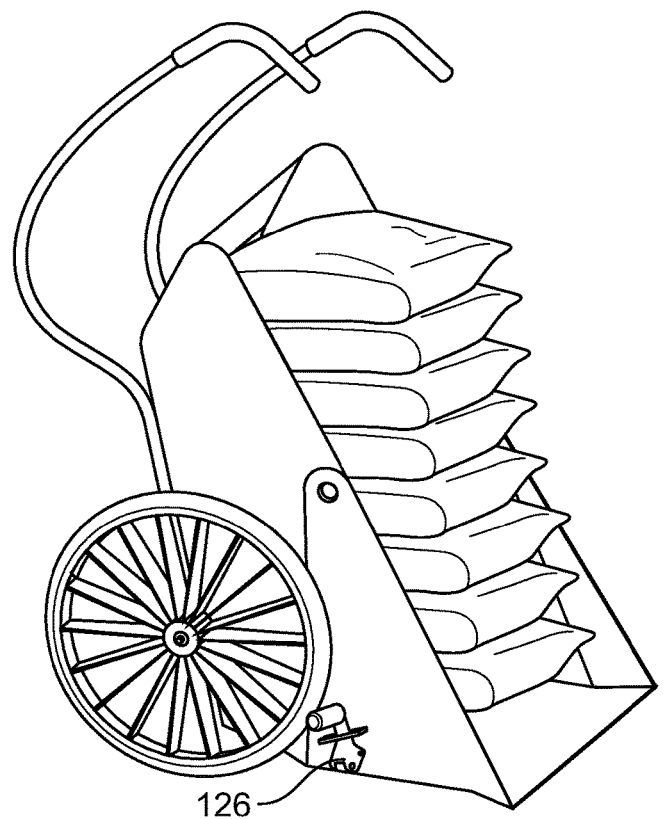

FIGS. 9A through 9D are perspective views of the cart shown in FIG. 2B being used to transport a stack of materials.

Figure 10:
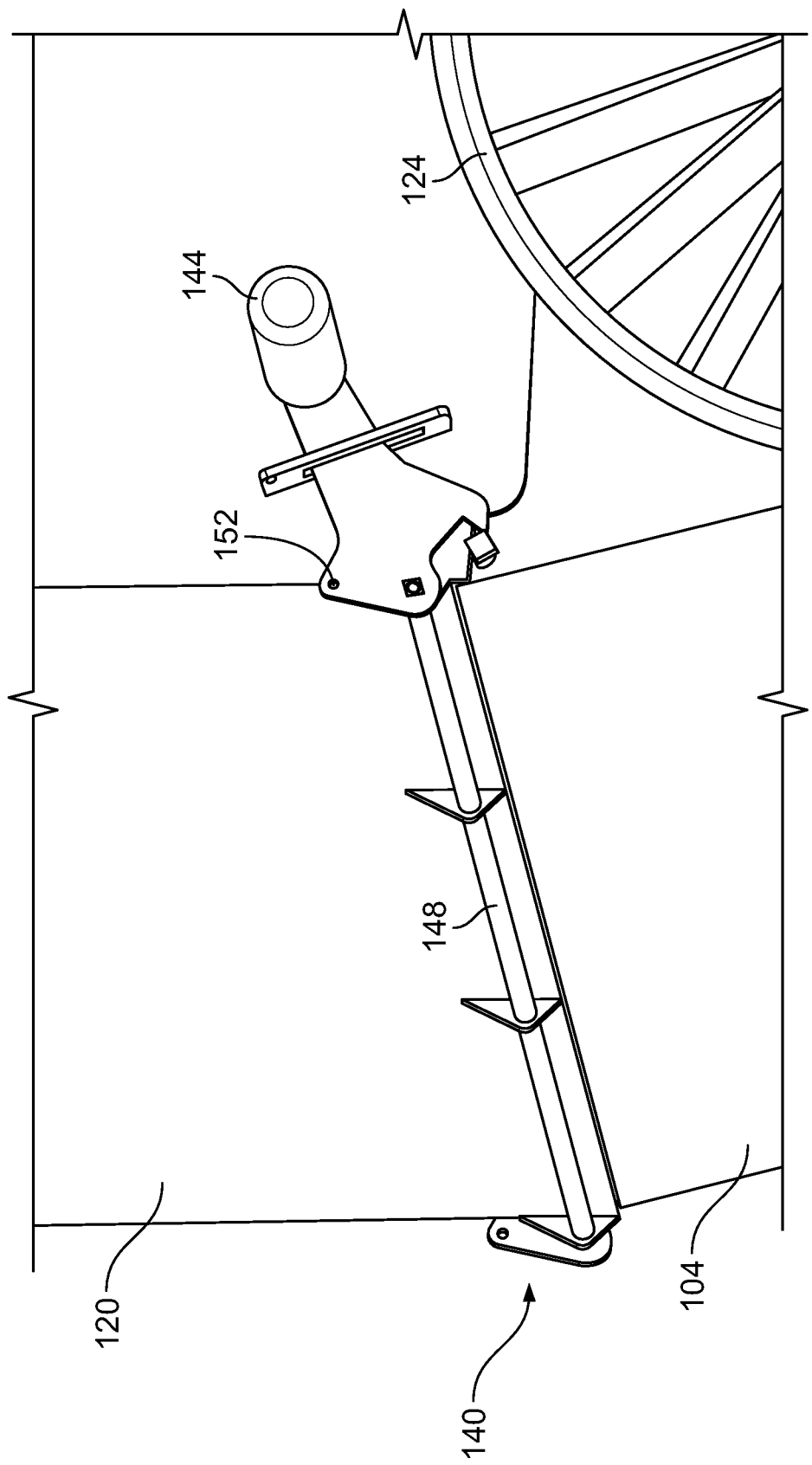

FIG. 10 is a perspective view of an exemplary latching mechanism that may be used for releasably coupling a scoop to a body of the cart shown in FIGS. 1A and 1B according to exemplary embodiment.

FIGS. 11A through 11D are perspective views of the cart shown in FIG. 1B where a strap has been attached to the latching mechanism shown in FIG. 10.

Figure 12:
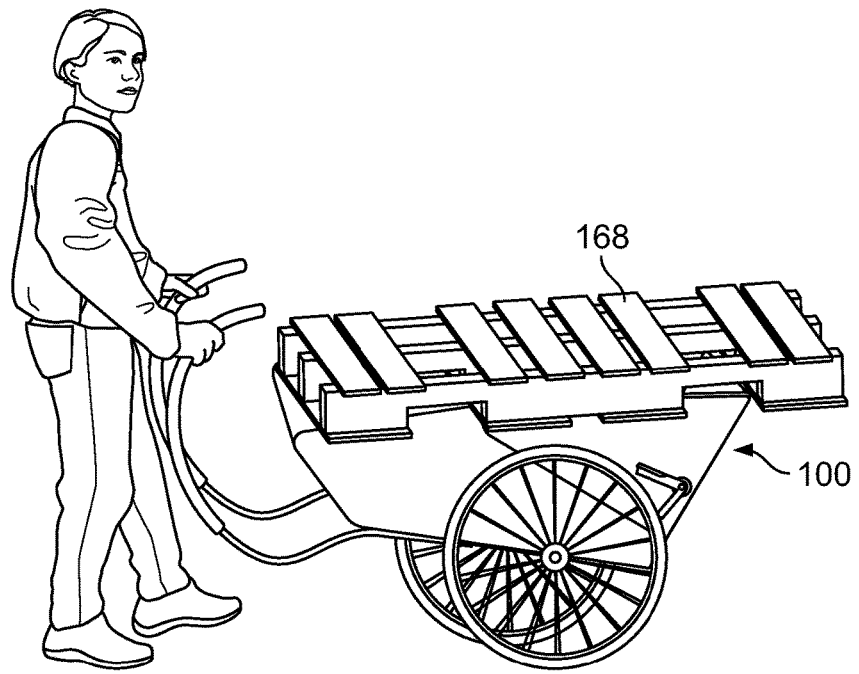
Figure 13:
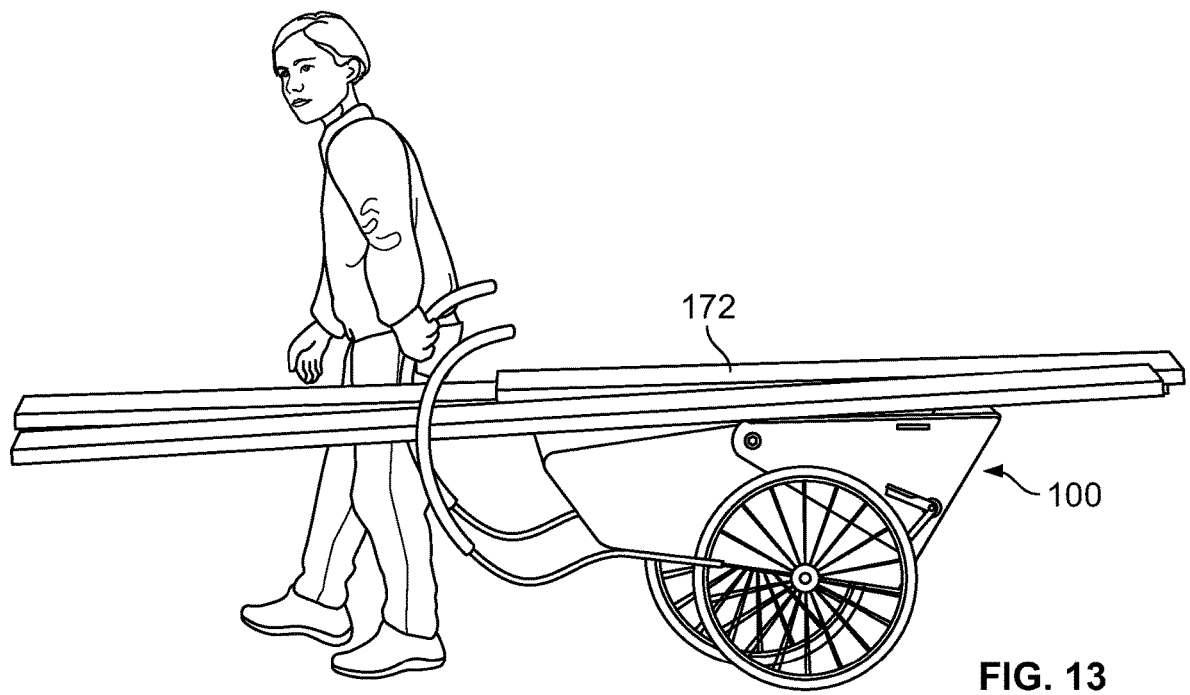

FIGS. 12 and 13 are perspective views of the cart shown in FIG. 1B being used to respectively transport a wooden pallet and long boards along a top of the cart.

Figure 14A:
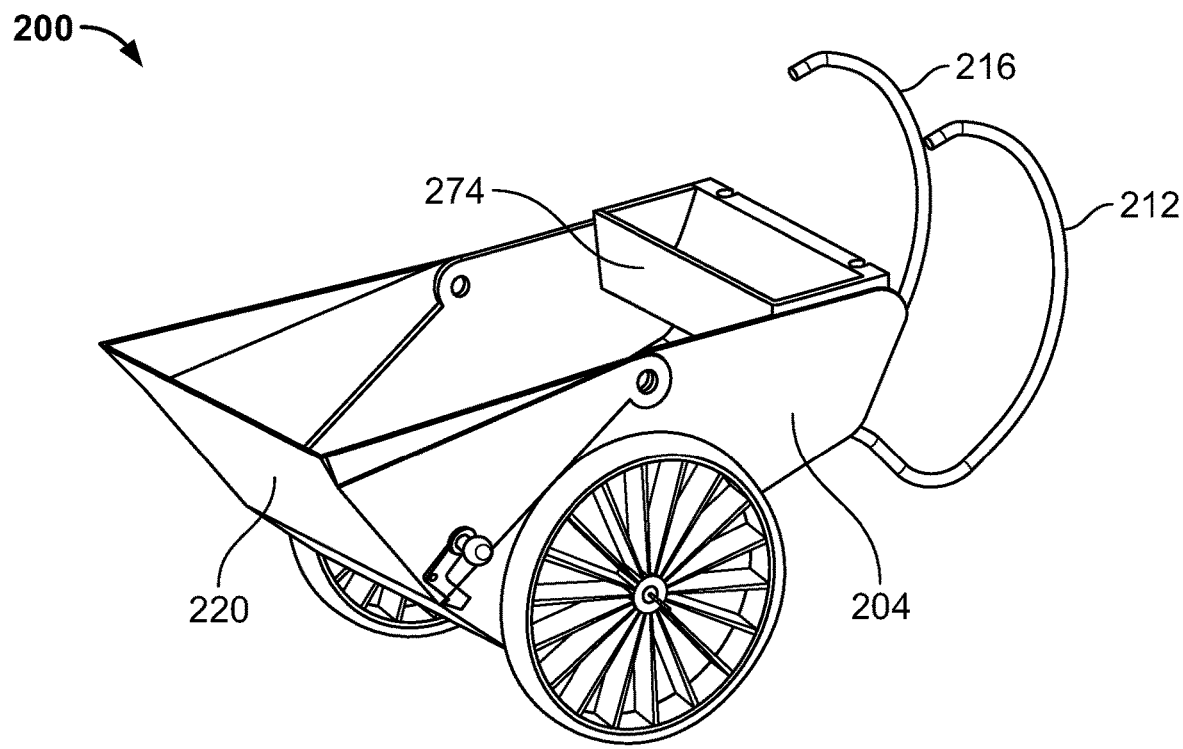
Figure 14B:
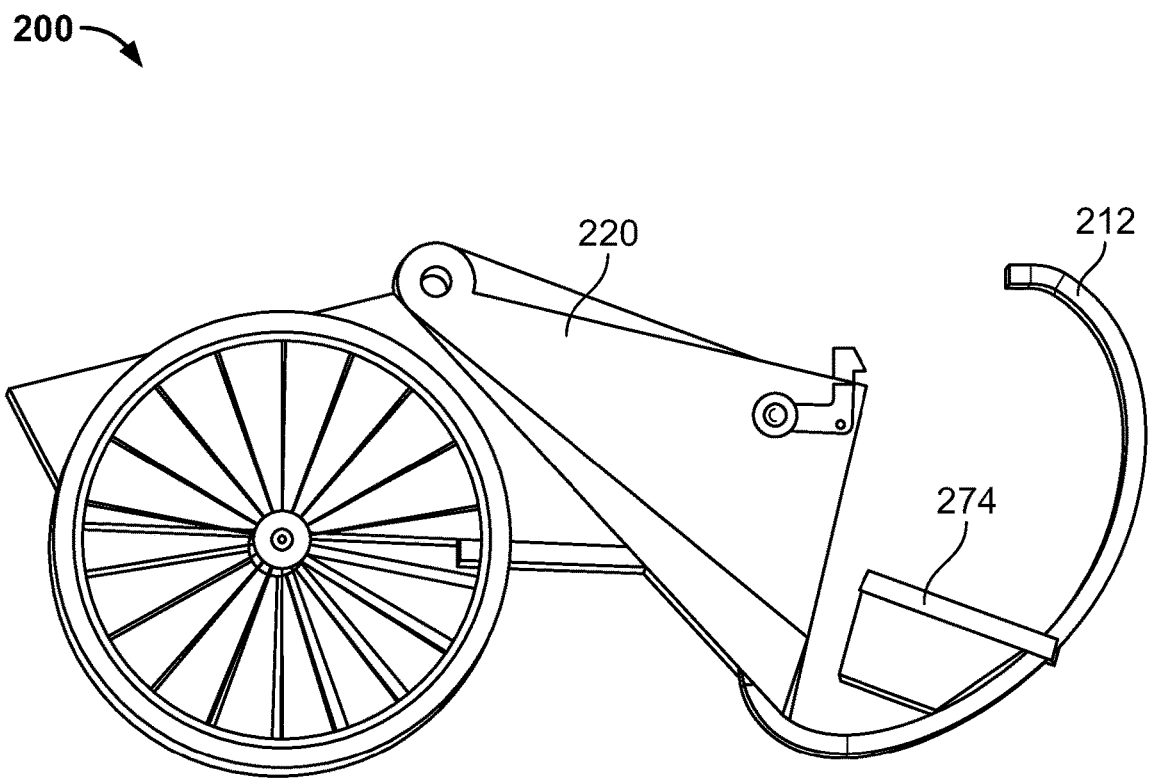

FIGS. 14A and 14B are perspective and side views of a cart including a trough or drop-in tub according to an exemplary embodiment.

Figure 15A:
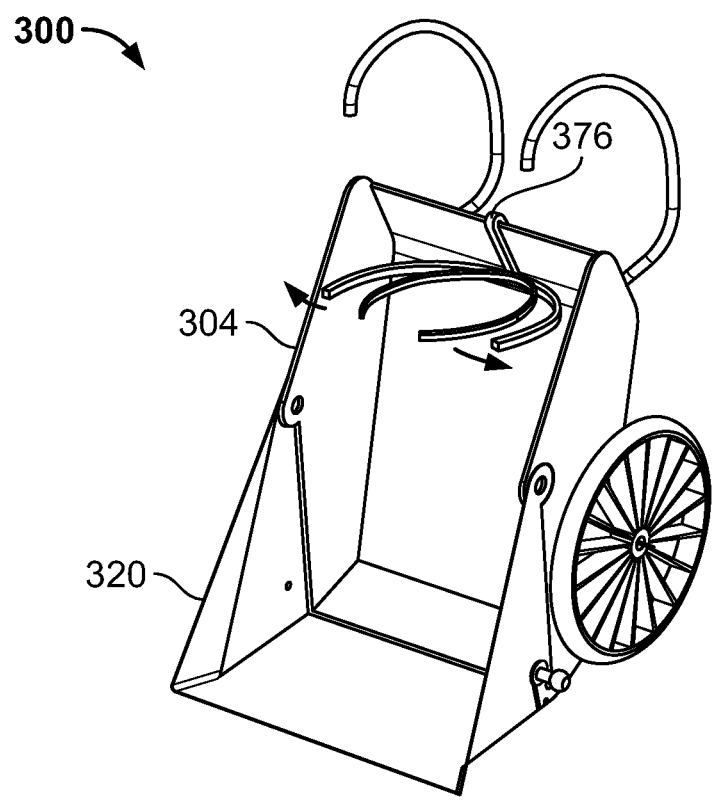
Figure 15B:
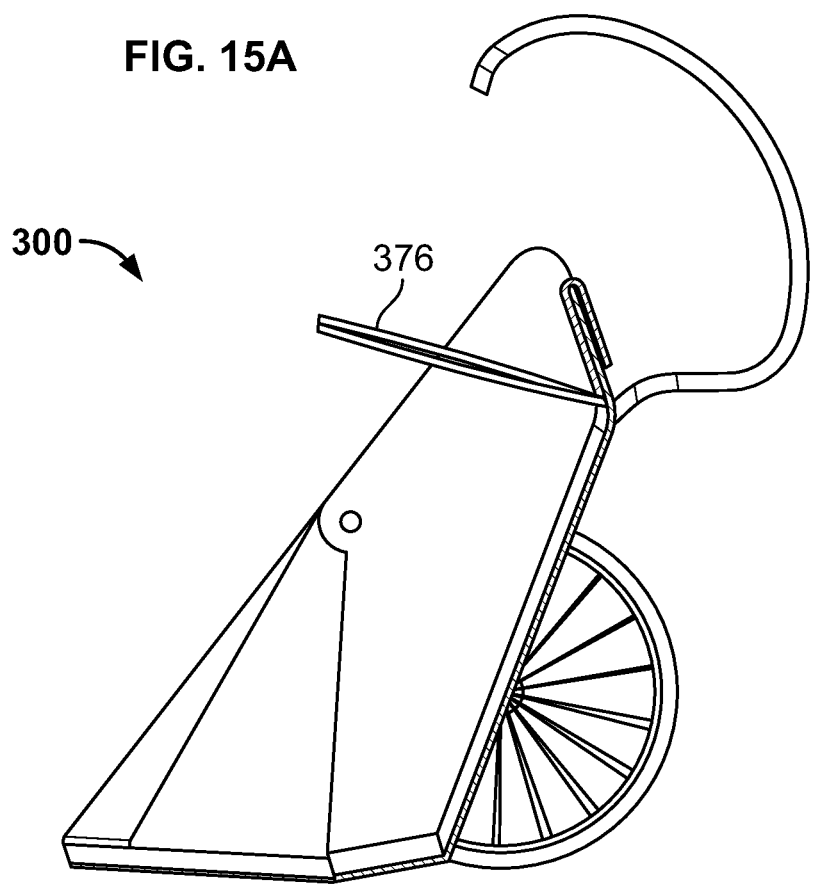

FIGS. 15A and 15B are perspective and cross-sectional side views of a cart including a bag holder according to an exemplary embodiment.

Figure 16A:
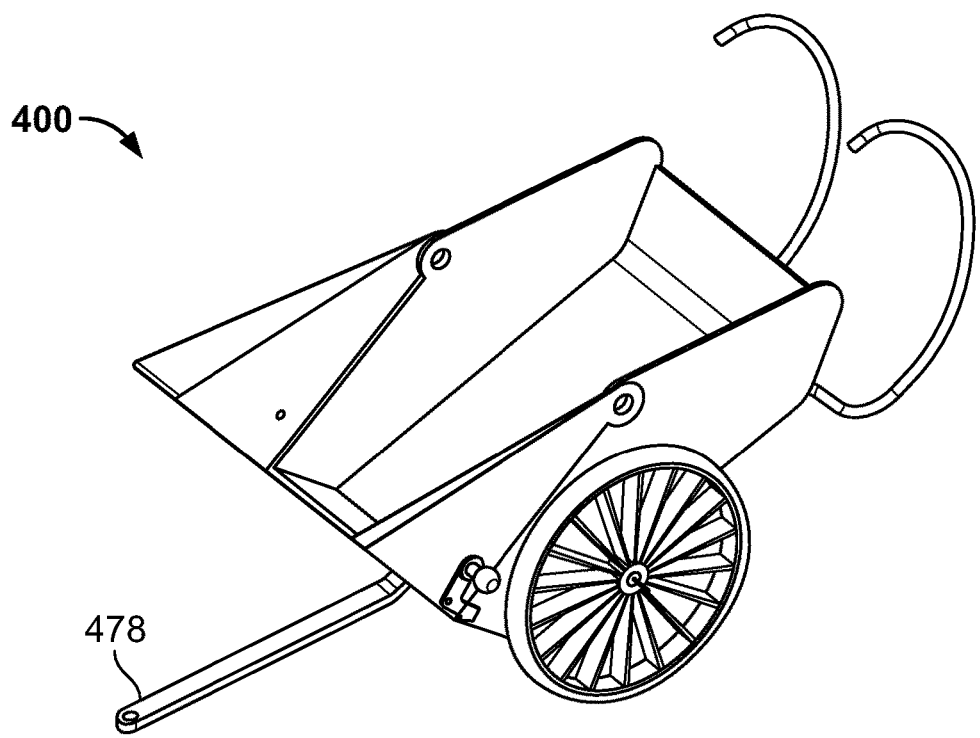
Figure 16B:
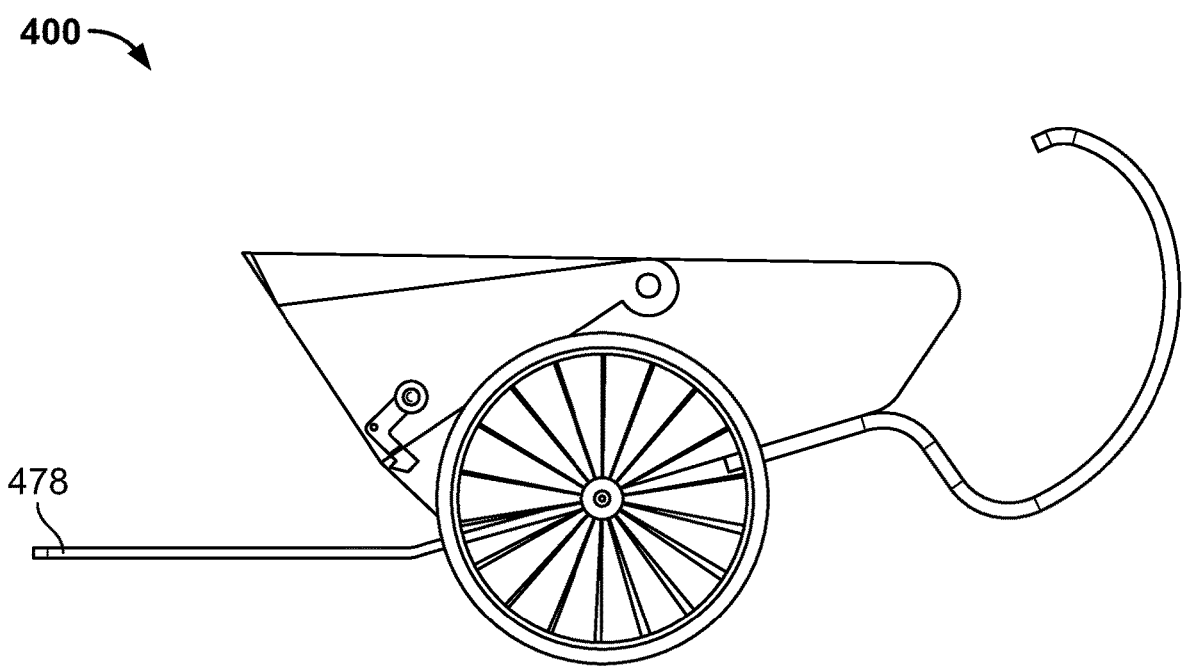

FIGS. 16A and 16B are perspective and side views of a cart including a hitch according to an exemplary embodiment.

FIGS. 17A through 17G are views of a cart including a tray with a tool holder according to an exemplary embodiment.

Figure 17A:
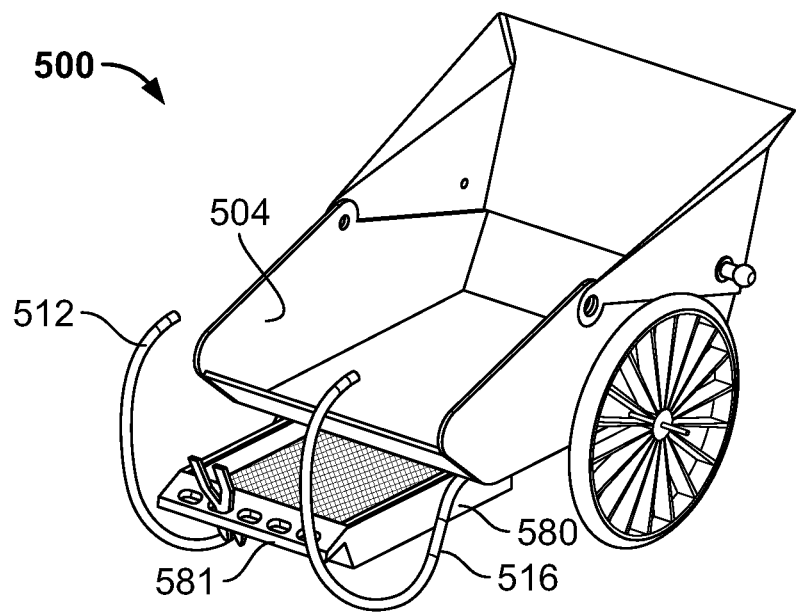
Figure 17B:
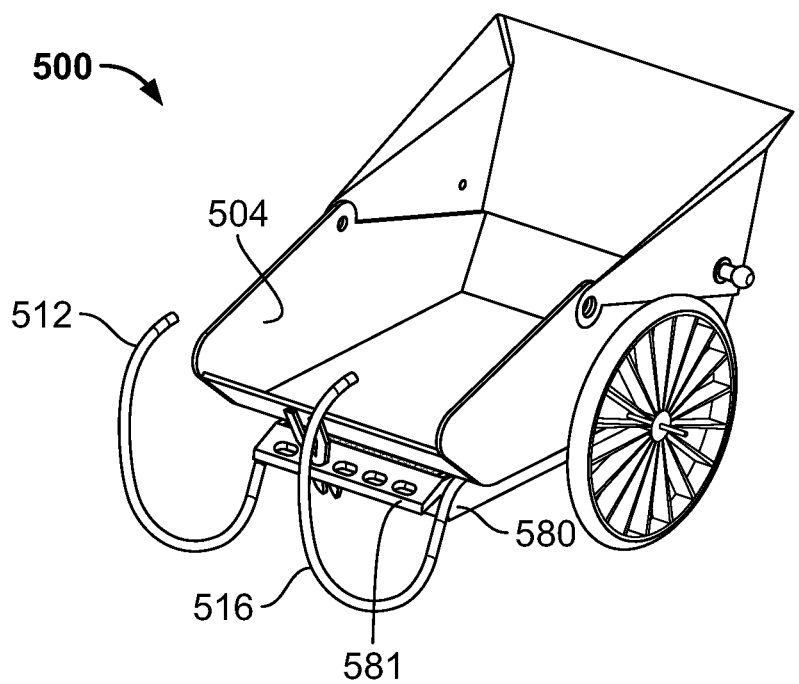
Figure 17C:
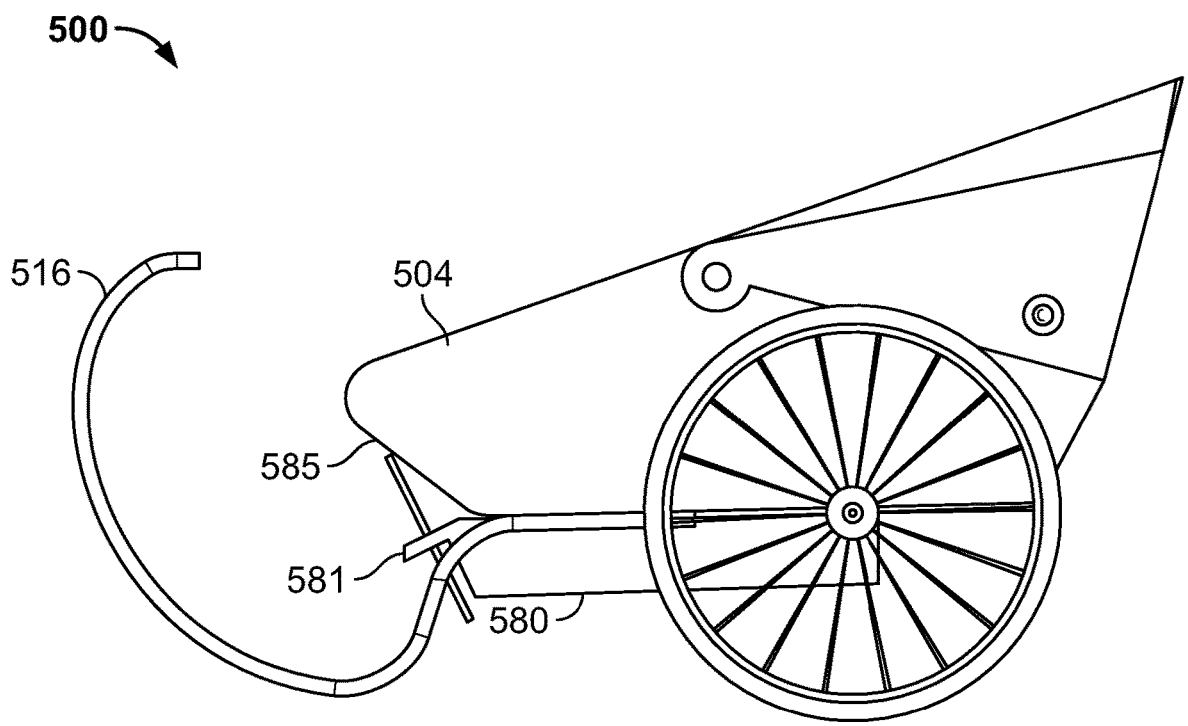
Figure 17D:
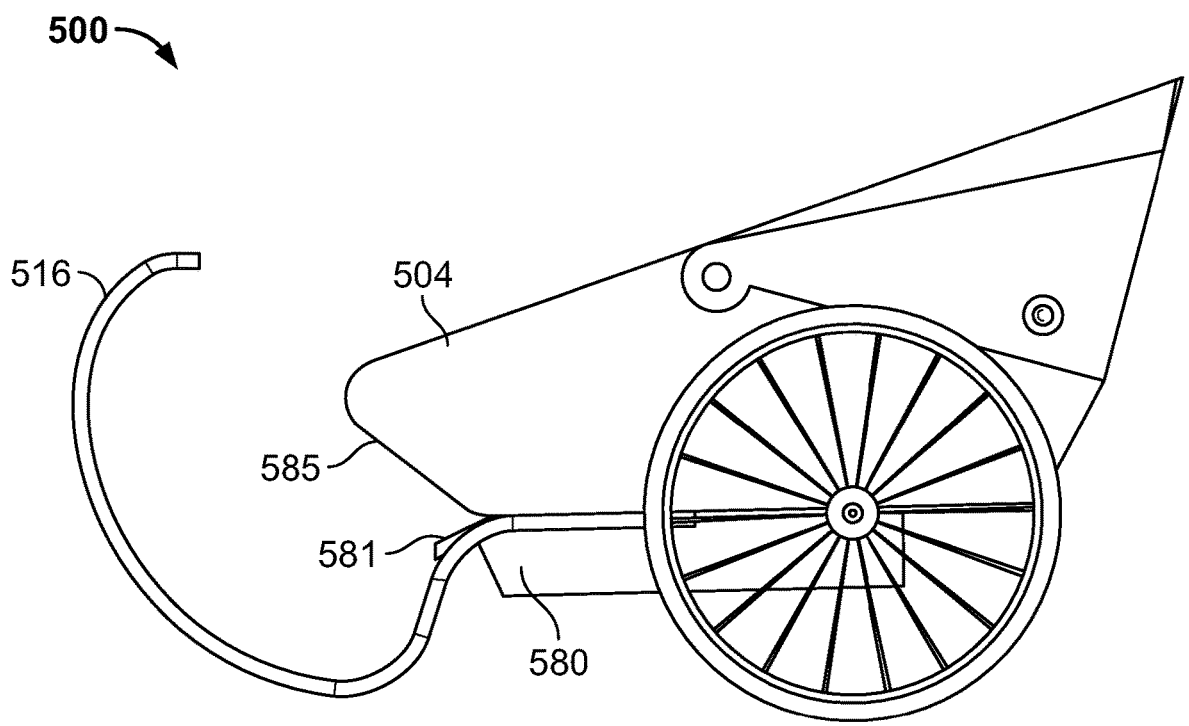
Figure 17G:
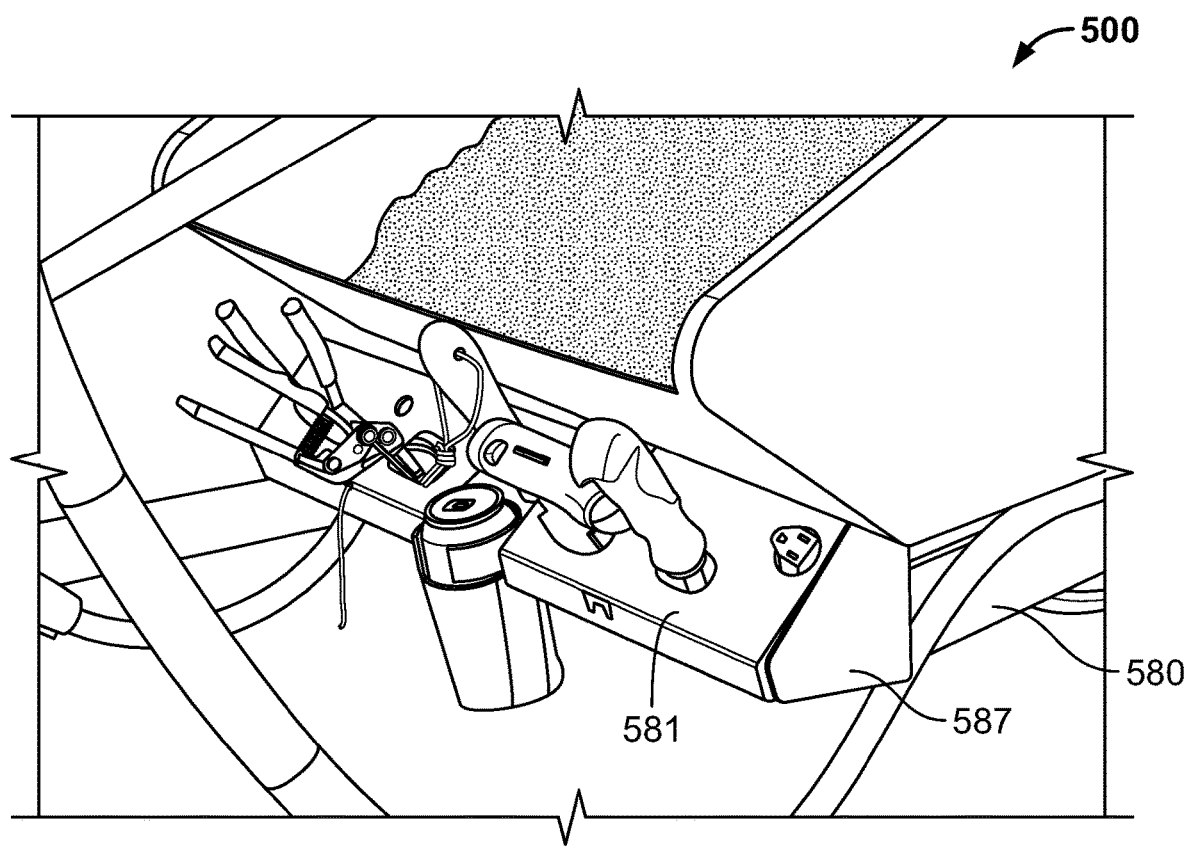
Figure 17H:
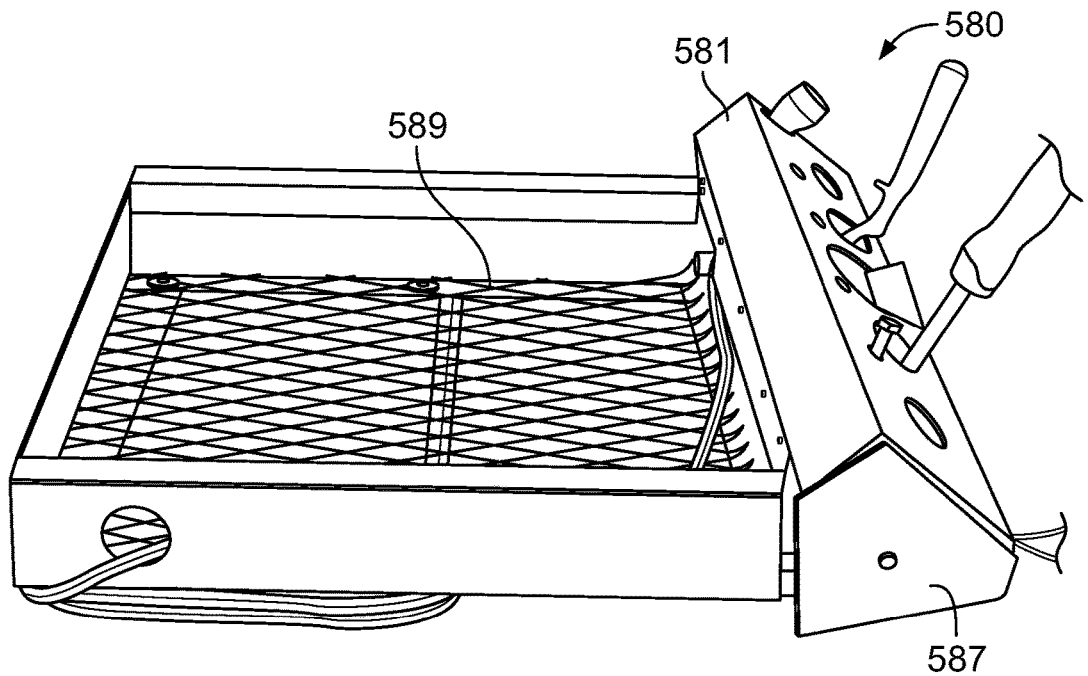

FIG. 17H is a perspective view of the tray shown in FIGS. 17E, 17F, and 17G.

Figure 18A:
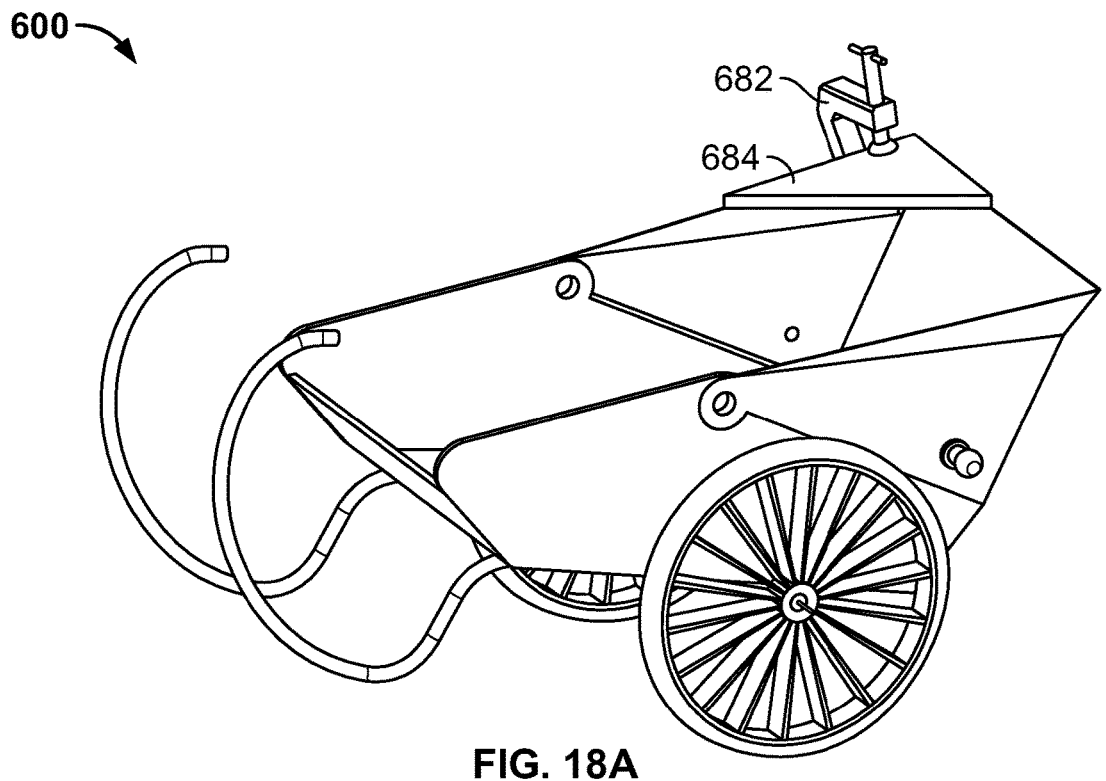
Figure 18B:
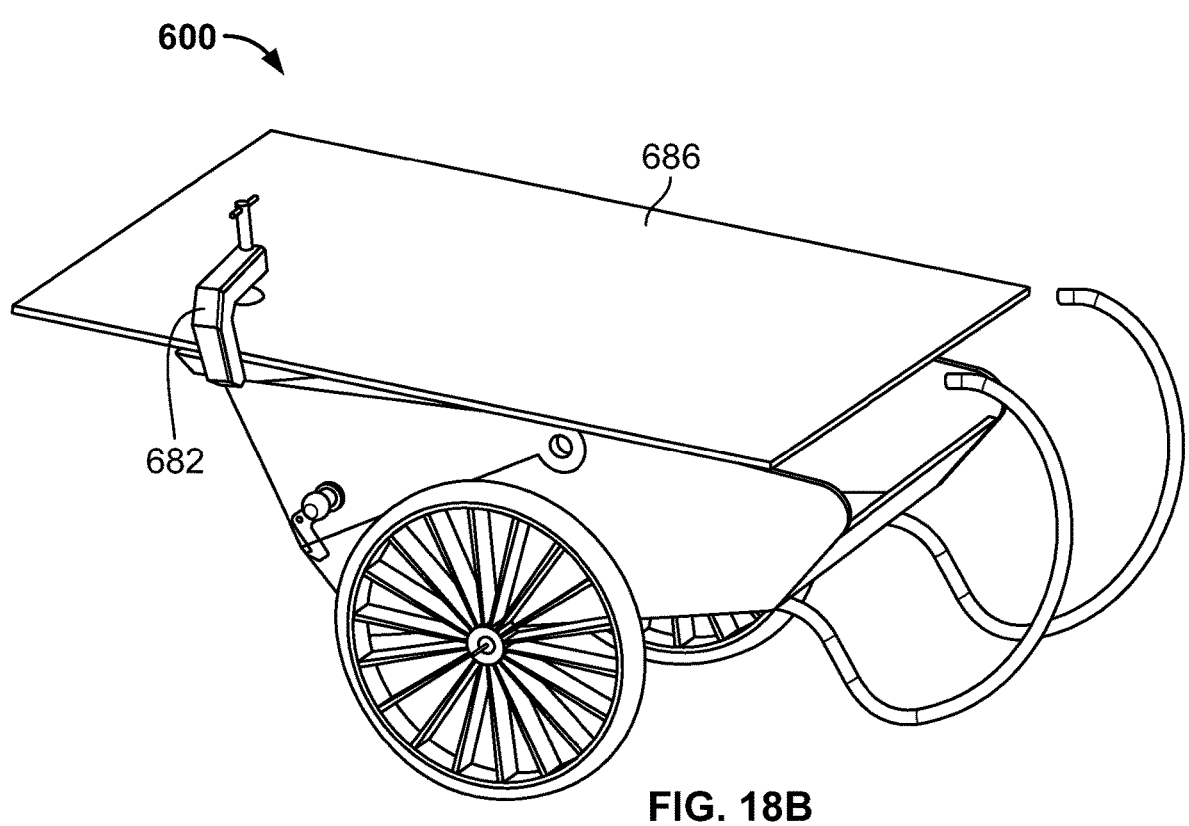

FIGS. 18A and 18B are perspective views of a cart including a work station according to an exemplary embodiment.

Figure 19:
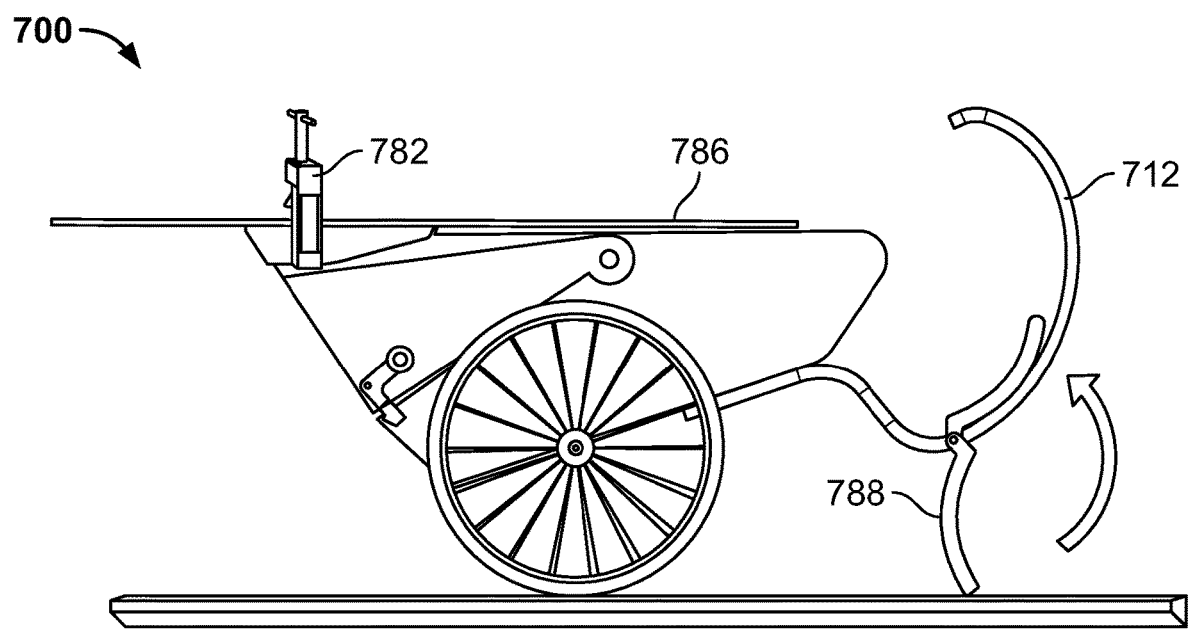

FIG. 19 is a side view of a cart including a kickstand according to an exemplary embodiment.

Figure 20A:
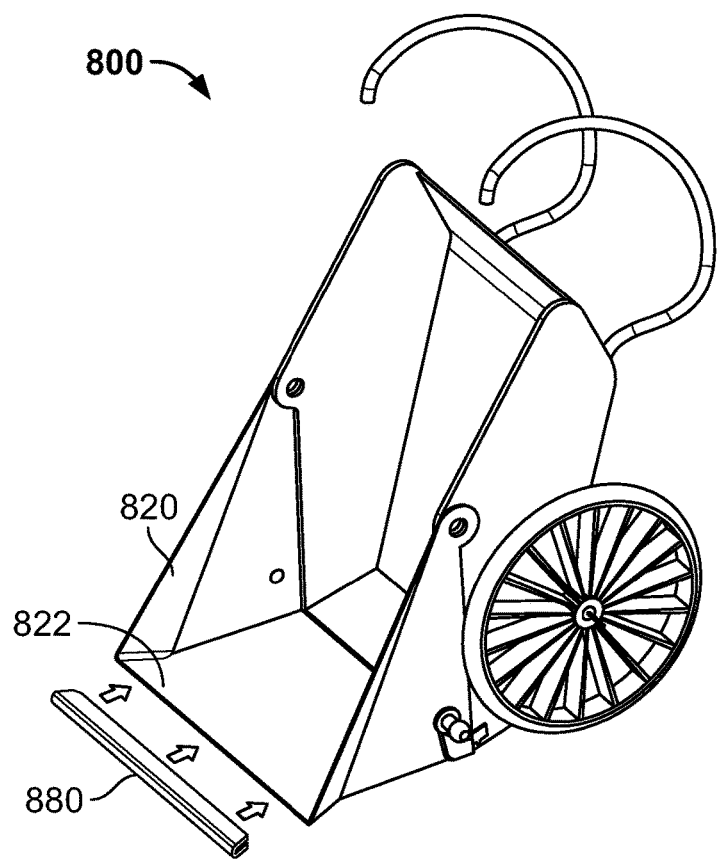
Figure 20B:
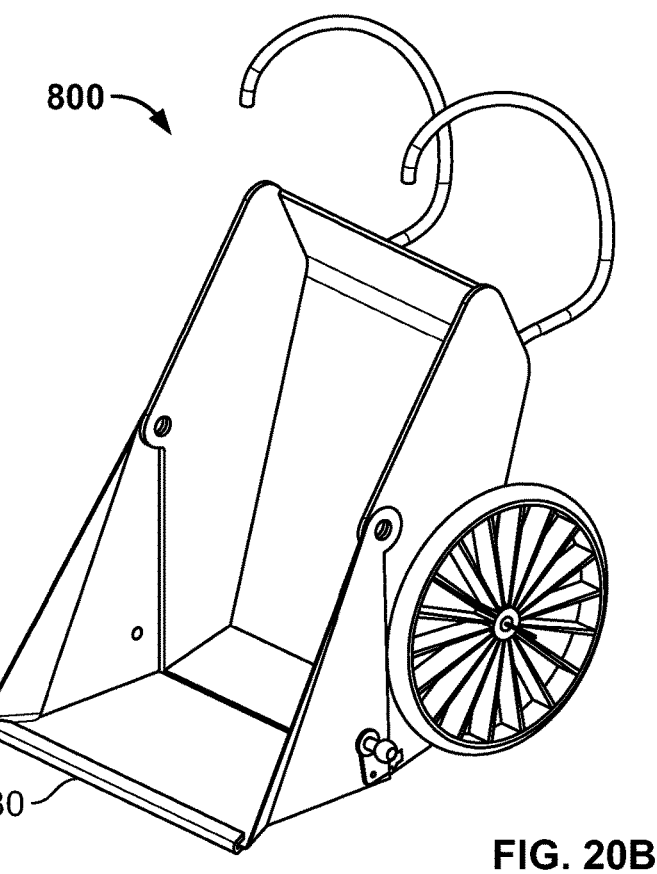

FIGS. 20A and 20B are perspective views of a cart including a wear strip positionable along a forward edge of the scoop according to an exemplary embodiment.

FIGS. 21A, 21B, 21C, and 21D are views of a cart including a wood rack according to an exemplary embodiment.

FIG. 22 is a perspective view of an exemplary scoop that may be used with a cart according to an exemplary embodiment.

FIG. 23 is a front view of the scoop shown in FIG. 22.

Figure 25:
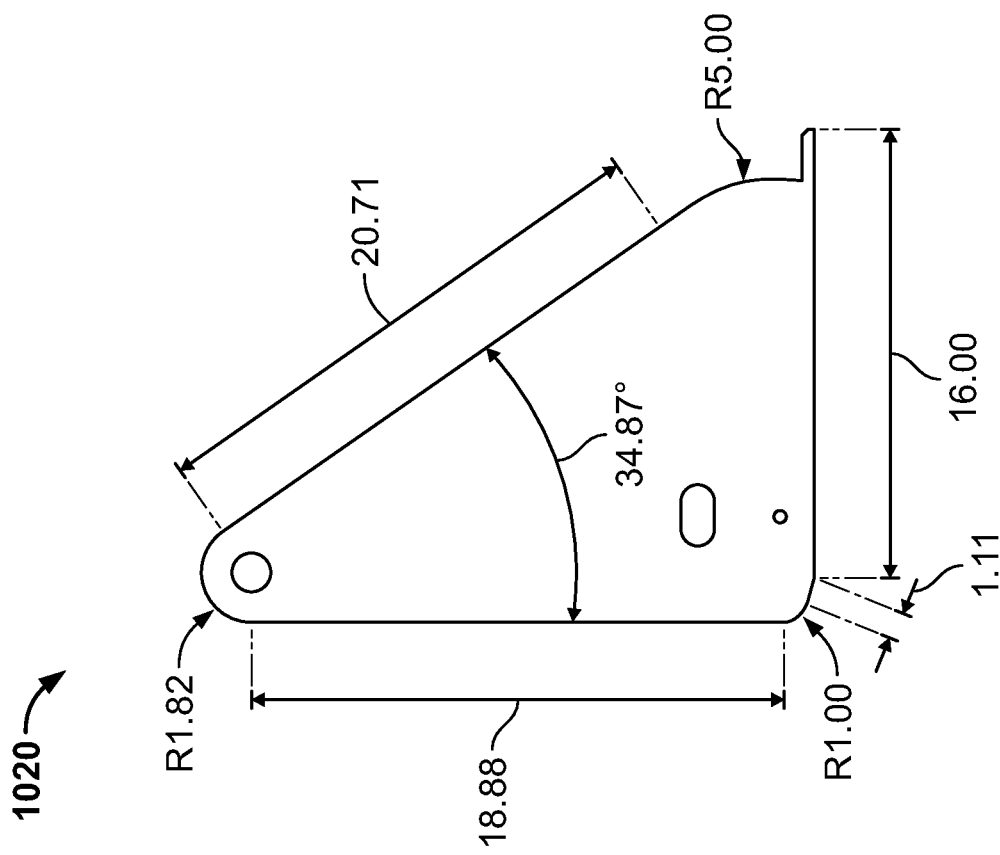
Figure 24:
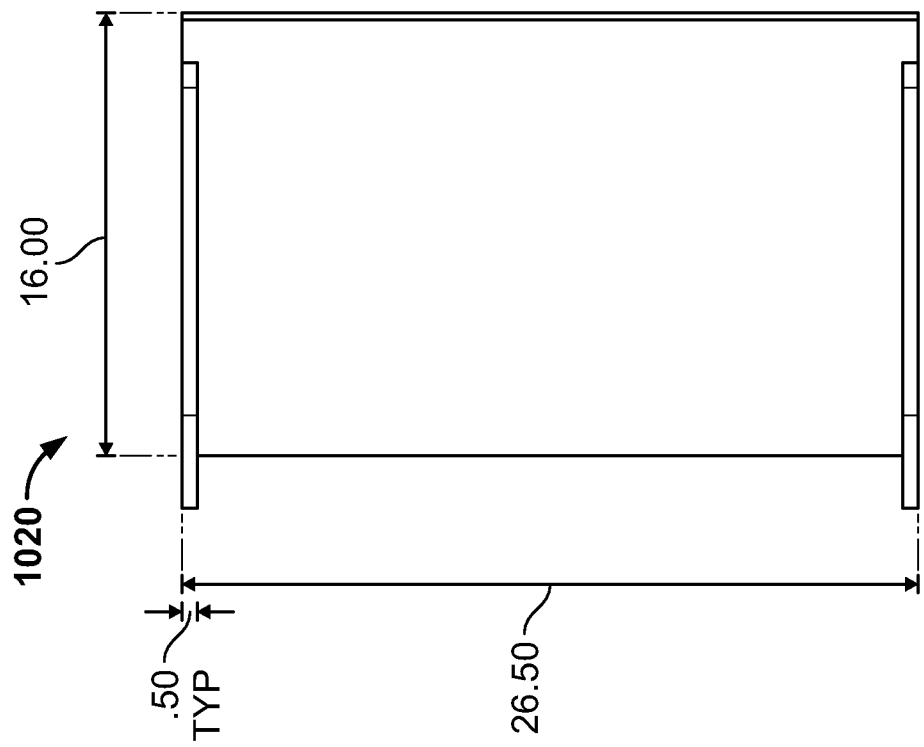

FIGS. 24 and 25 are top and side views of the scoop shown in FIG. 22 where exemplary dimensions (in inches and degrees) are provided for purpose of illustration only.

Figure 27:
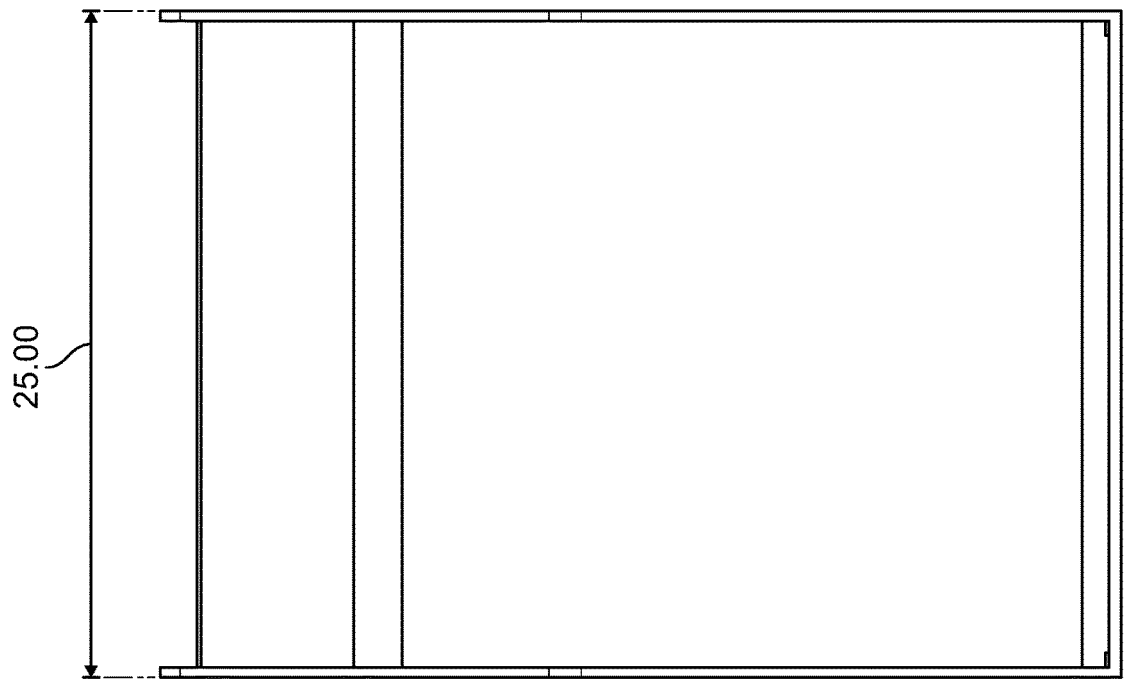
Figure 26:
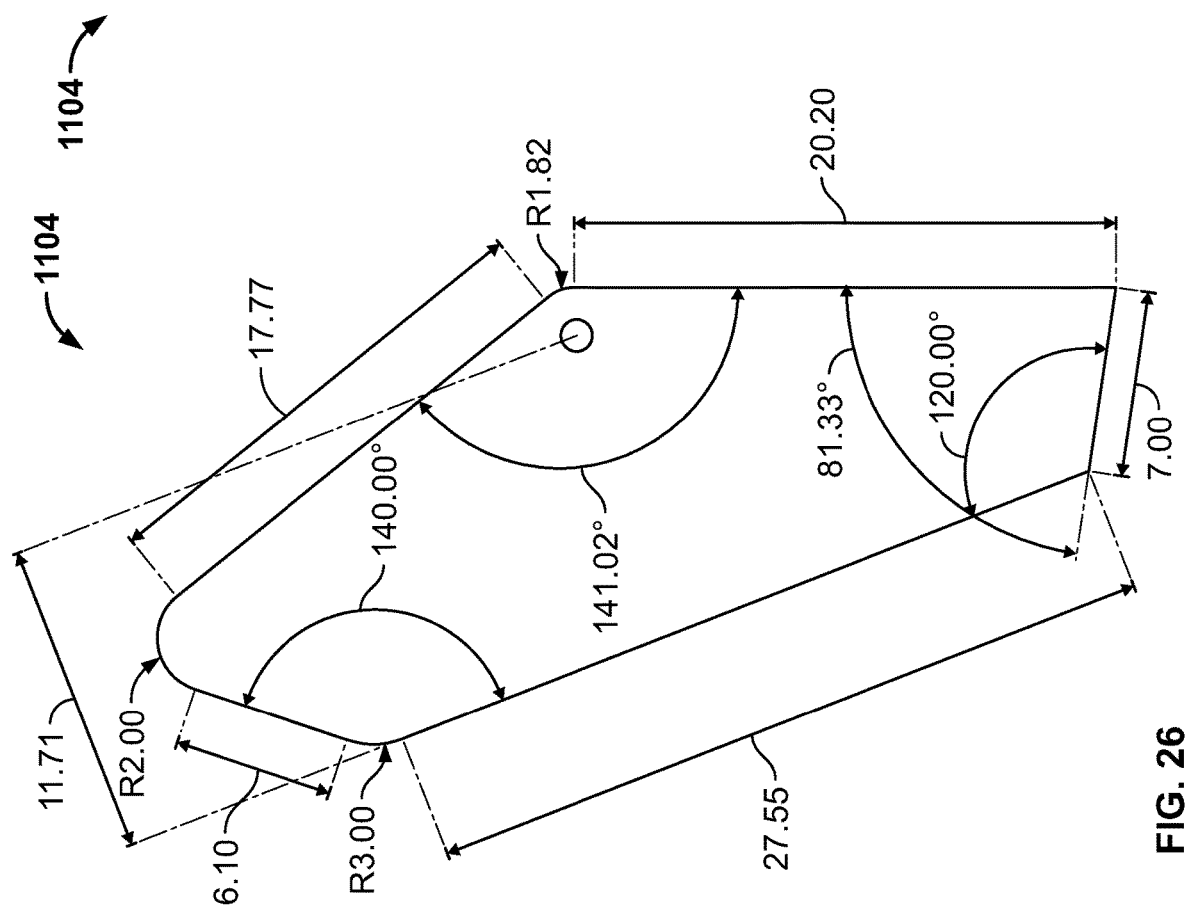

FIGS. 26 and 27 are side and top views of an exemplary body that may be used with a cart according to an exemplary embodiment, where exemplary dimensions (in inches and degrees) are provided for purpose of illustration only.

Figure 28B:
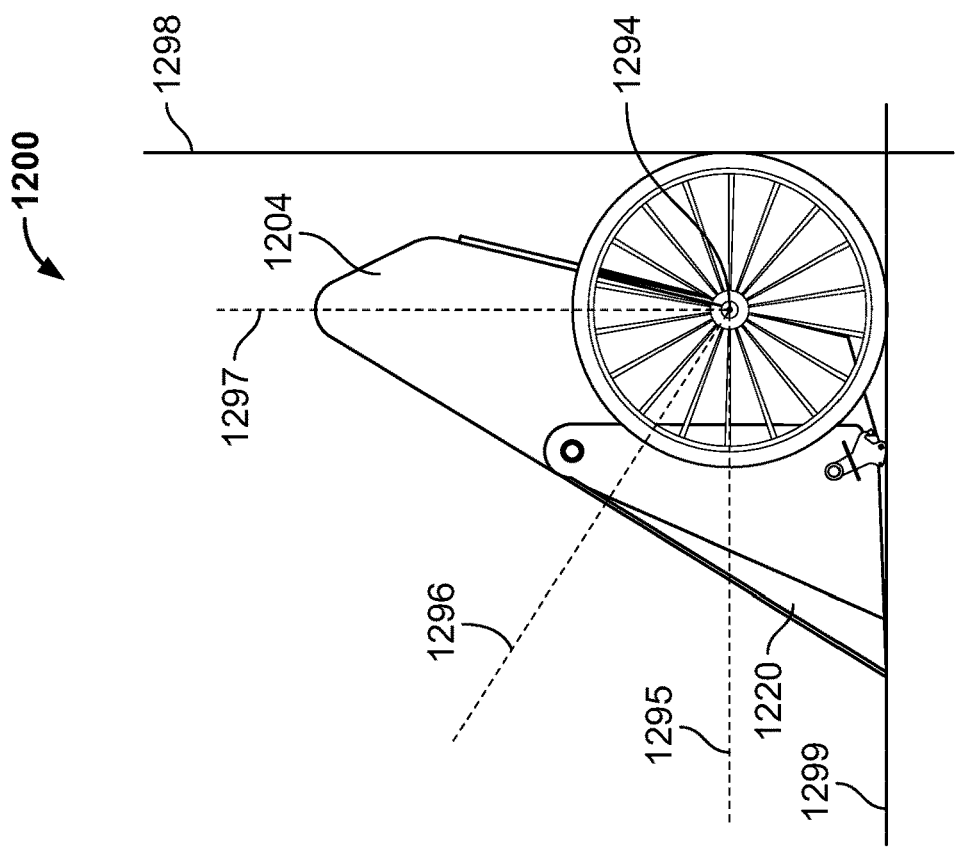
Figure 28A:
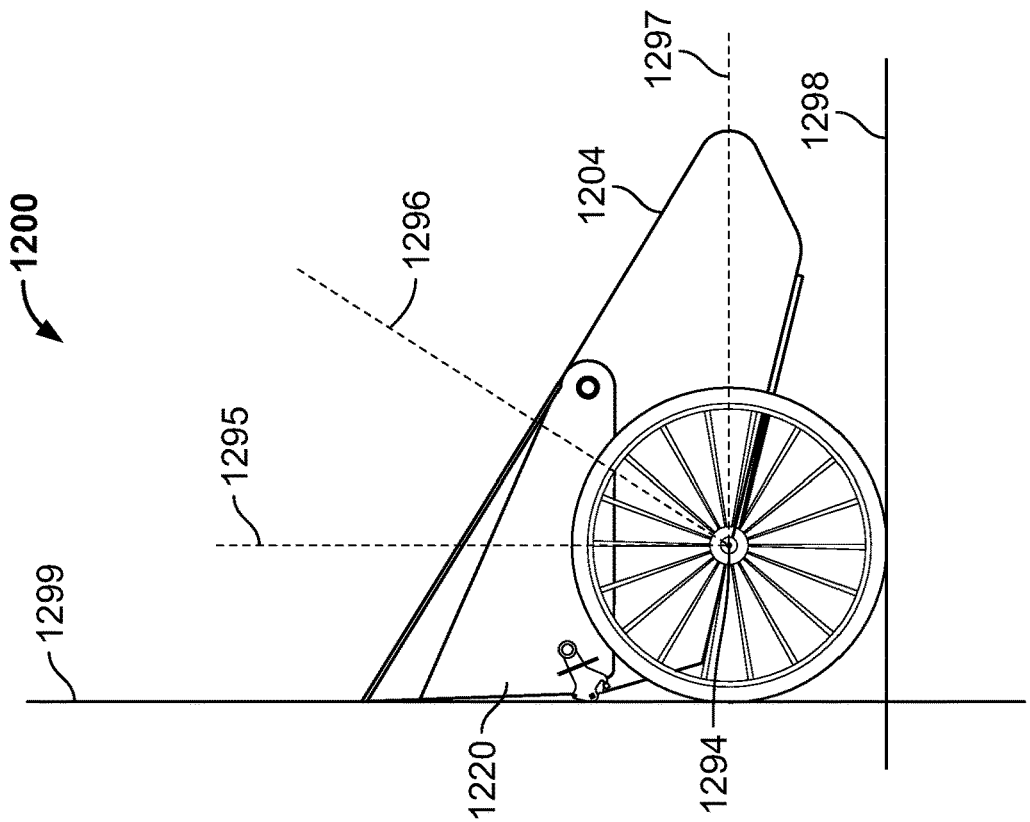

FIGS. 28A and 28B illustrate how the portion of the load in front of and behind the axle shifts or changes for the different configurations of a cart according to exemplary embodiments.

Corresponding reference numerals indicate corresponding parts throughout the several views of the drawings.

DETAILED DESCRIPTION

Example embodiments will now be described more fully with reference to the accompanying drawings.

According to exemplary aspects of the present disclosure, exemplary embodiments are disclosed of a cart (broadly, an apparatus or device) that can be simply and quickly reconfigured between a plurality of different configurations suitable for a variety of types of materials. The different configurations include configurations for loading, filling, dispensing, unloading, hand truck functions, for performing specific functions generally associated with garden carts, wheelbarrows, wood carriers, and hand trucks and without detachable parts for the main function. Also disclosed are methods relating to loading, transporting, and/or dispensing materials, including scooping and lifting loads without shoveling, hand digging, or using loading tools.

Exemplary embodiments are disclosed of a cart that may be used for loading, carrying, and unloading materials, such as loose materials (e.g., mulch, soil, gravel, etc.), large and heavy materials (e.g., firewood, potted plants, rocks, other items/objects, etc.), etc. The cart may also or alternatively be used for performing other activities and/or with other types of materials to be scooped, picked up, carried, moved, deposited, dispersed, spread, etc. As disclosed herein for exemplary embodiments, a cart may be configured or designed to facilitate easier loading or filling of material into a main body of the cart from the front with less lifting or manual loading, whereby the operator's body weight may be used to lift and complete the loading process. Also, the cart may be reconfigured to facilitate alternating between unloading from either the front or the back, such as by using a shovel or other tool. Or, for example, the cart may be tipped forward to dump or slide material from the front of the cart. In exemplary embodiments, the cart may also accommodate transporting heavy and/or bulky objects much like a traditional hand truck, wood carrier, etc. The cart may also be configured to have snow removal capabilities. Accordingly, a cart disclosed herein may be used for a wide variety of activities, including use as a hand tool for loading, unloading, transporting or otherwise moving and dispensing or spreading materials and objects. The carts disclosed herein may be used in a wide range of applications, including yard or garden applications, general uses around the home, etc.

In an exemplary embodiment, a cart usable for loading, transporting, and unloading/dispersing materials (e.g., garden, yard, home, and/or construction materials, etc.) generally includes wheels, legs or supports, handles, a body or bin, and a rotatable scoop or nose (broadly, a rotatable portion or assembly). The body may be mounted or integrated onto handles that include the legs or supports for contacting the ground or other support surface and handle portions for a user to grab. The scoop and the body may generally define the main body, bin, or load carrying portion of the cart. The scoop may be rotatably attached (e.g., hinged, etc.) to the body or other portion of the cart such that the scoop is rotatable relative to the body between a plurality of positions including a forward position and a rearward, retracted, or stored position. When the scoop is in its forwardmost position, the scoop may be secured or locked (e.g., latched, etc.) in place adjacent a forward portion of the body, whereby the scoop increases carrying capacity of the cart. When the scoop is in its rearward, stored, or fully retracted position, the scoop may be disposed at least partially over and/or adjacent a rearward portion of the body generally between and in contact with the handles.

The scoop when secured to the cart body in a forward position expands/extends the cart and increases the cart's ability to scoop, lift, and carry more materials. The scoop may have a generally or roughly triangular-shaped side profile. The scoop may attach at about or roughly to the center and highest (tallest) point of the side walls of the cart body, which may help to maximize the cart's carrying capacity and facilitate other functions disclosed herein. The cart body may have a shorter front wall that in some configurations of the cart may be used or serve as a hand truck deck for lifting and carrying heavy or dense objects.

The cart with the scoop in place in the forward position may be tipped forward to rest the scoop leading edge or tip on the ground for loading materials and/or for pushing the scoop to dig into loose materials (e.g., dirt, mulch, gravel, snow, etc.) to more efficiently fill and load the scoop, which when tipped up would more quickly fill the cart prior to transport. The scoop when positioned in its forward position might provide the cart with a more wedge-shaped side profile, which may be significantly higher in the front to facilitate scooping, loading, and carrying in the scoop. The scoop may also be released and rotated rearward to provide access and/or removal of the materials from the cart more quickly or easily. The scoop may be rotated to its rearwardmost position to store the scoop mostly at or below the top edge of the rear wall of the cart body. With the scoop in its rearward, fully retracted, or stored position, materials in the cart can more easily be dumped or unloaded from the front over or off the relatively short wall that forms the load-bearing deck when the cart is configured and used as a short-deck hand truck. The cart is also reconfigurable for use as a long-deck hand having a longer deck when the scoop is in its forward position for carrying bulkier and generally larger objects.

With reference now to the figures, FIGS. 1 through 13 illustrate an exemplary embodiment of a cart 100 (broadly, an apparatus or device) embodying one or more aspects of the present disclosure. As shown, the cart 100 generally includes a body 104, a wheel assembly 108, first and second handles 112 and 116, and a scoop 120. The scoop 120 is rotatable relative to the body 104 between a plurality of positions including a forward position shown in FIGS. 1A, 1B, 2A, 2B and 5A and a rearward position shown in FIGS. 3A, 3B, 4A, 4B, and 5E.

In the forward position, the scoop 120 is adjacent a forward portion of the body 104 such that the scoop 120 increases carrying capacity of the cart 100. In the rearward position, the scoop 120 is disposed at least partially over and/or adjacent the rearward portion of the body 104.

Figure 3A:
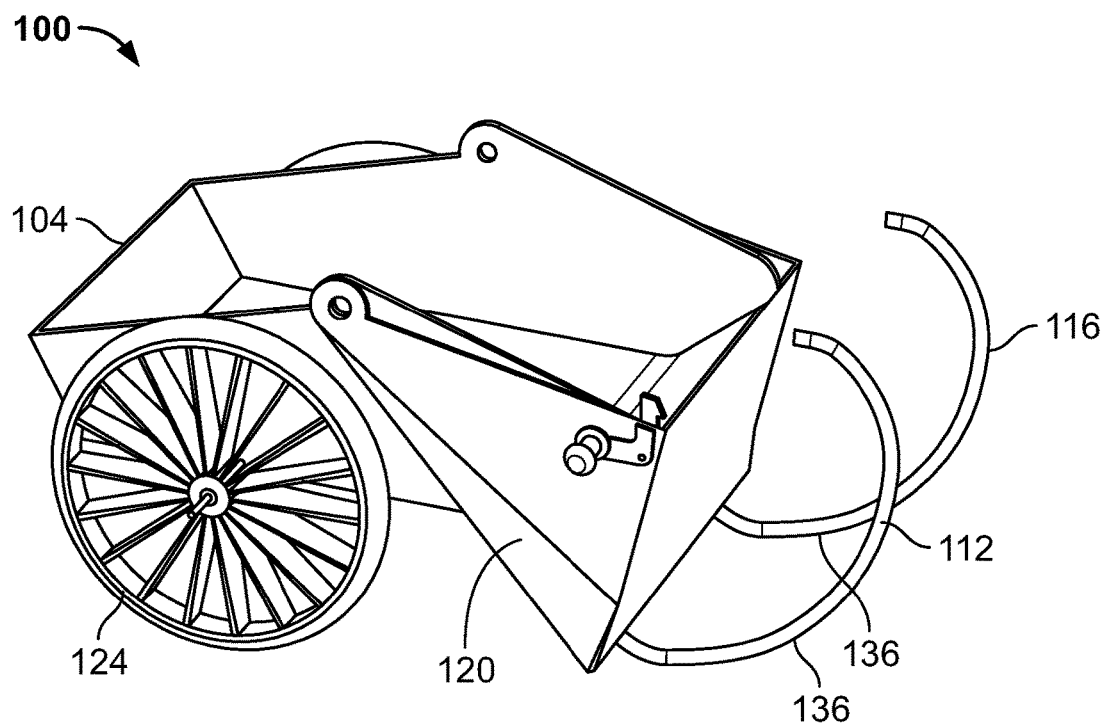
FIGS. 3A and 3B are perspective views of the cart shown in FIGS. 1A and 1B after the scoop has been rotated to a rearward, fully retracted, or stored position.
Figure 3B:
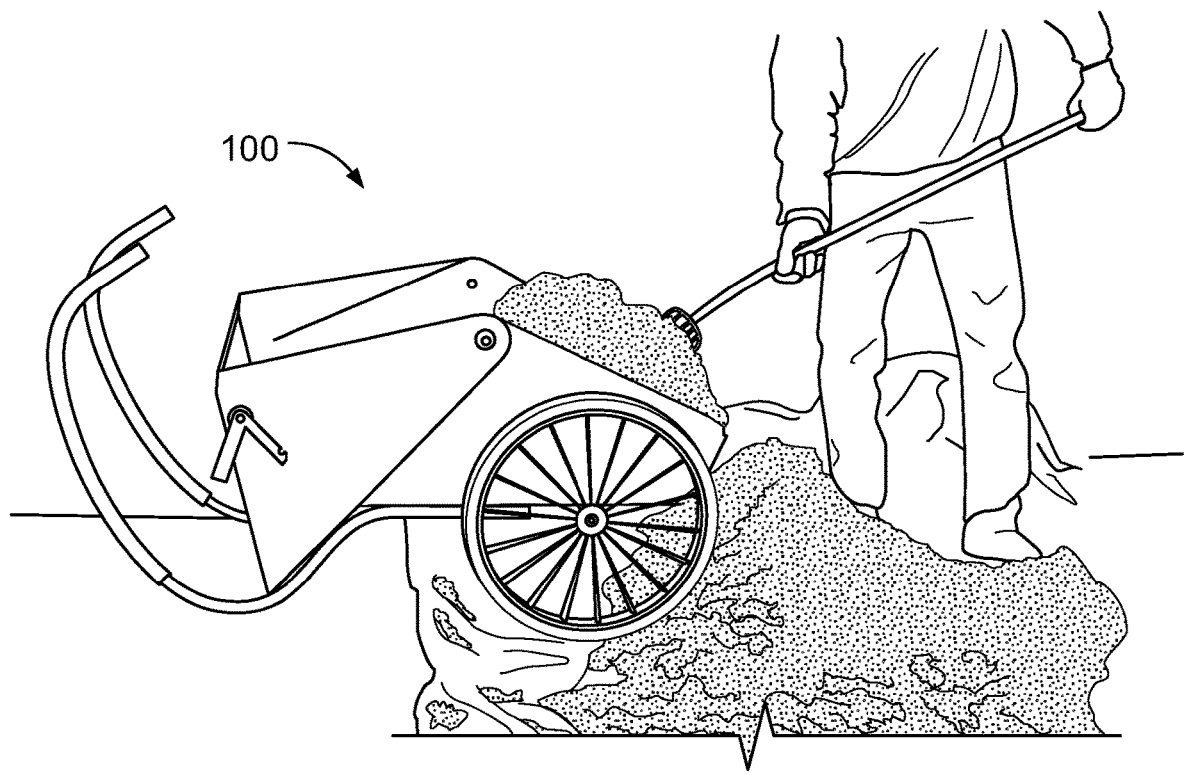
Figure 4A:
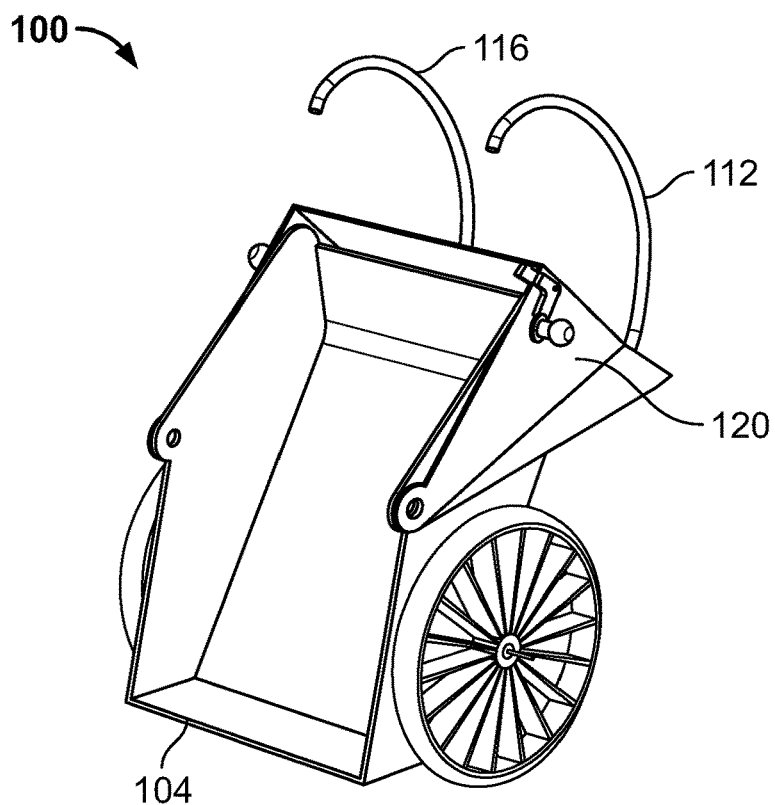
FIGS. 4A and 4B are perspective views of the cart shown in FIGS. 3A and 3B after the cart has been tipped forward such that the cart is in an unloading configuration and/or a configuration in which the cart is usable as a short-deck hand truck for heavy or very dense objects.
Figure 4B:
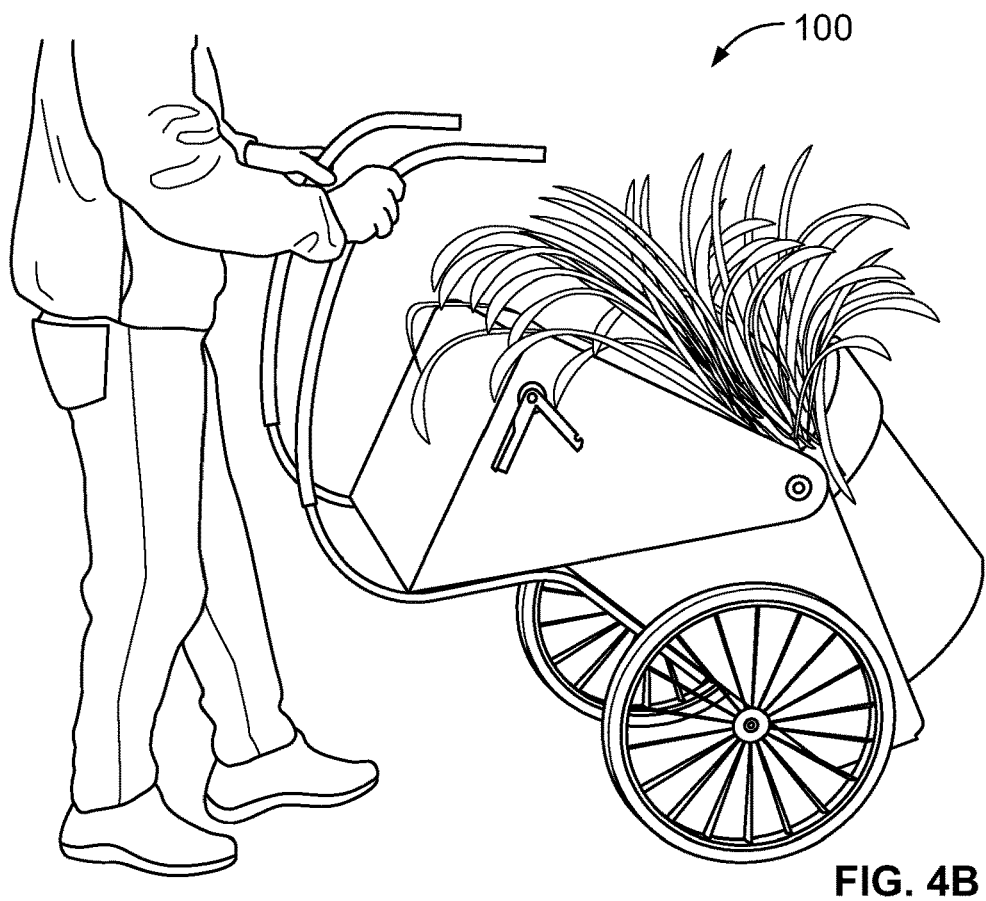

The wheel assembly 108 includes an axle and first and second wheels 124 and 128. In this exemplary embodiment, the wheel assembly 108 includes a single axle coupled to and/or underneath the body 104. The single axle includes first and second end portions. The first and second wheels 124, 128 are coupled to the respective first and second end portions of the axle such that the first and second wheels 124, 128 are along or adjacent first and second side portions of the body 104. Also, the first and second wheels 124, 128 may be relatively large, for example, to enable easier transport over uneven terrain including stairs and to reduce the force needed to rotate a load off the ground or other support surface per degree of rotation. By way of example, the cart's wheels 124, 128 may have an outer diameter of at least about 15 inches (e.g., 15 inches, 16 inches, 20 inches, etc.). The wheels 124, 128 may be configured such that the wheels 124, 128 do not extend outwardly beyond the edge of the sidewall of the body 104 when the scoop 120 is in the rearward position as shown in FIGS. 3B and 4B. In alternative embodiments, a cart may have a differently configured wheel assembly, such as wheels having a larger or smaller diameter and/or a wheel assembly including two axles with each of the two wheels coupled to a different one of the two axles.

Each of the first and second handles 112, 116 includes a handle portion 132 for a user to grab while moving the cart 100, e.g., tipping, rotating, or rolling the cart 100, etc. Each of the first and second handles 112, 116 also includes a leg portion or support 136 for contacting the ground or other support surface when the cart 100 is at rest as shown in FIG. 1B. The leg portions 136 are configured to inhibit movement of the cart 100 along the support surface when material is being loaded into the cart 100. The first and second handles 112, 116 are spaced apart to allow a user to stand between the first and second handles 112, 116 while using the cart 100. Thus, a front of the cart 100 is accessible to the user when standing behind the cart 100 and between the first and second handles 112, 116.

The cart 100 is reconfigurable into a plurality of different configurations. For example, FIGS. 1A and 1B show a first configuration in which the scoop 120 is in the forward position and the leg portions 136 of the first and second handles 112, 116 are in contact with the ground or other support surface. FIGS. 2A and 2B show a second configuration in which the scoop 120 is in the forward position and in contact with the support surface and the body 104 is upright relative to the support surface. FIGS. 4A and 4B show a third configuration in which the scoop 120 is in the rearward position and the body 104 is upright relative to the support surface with a front end wall of the body 104 in contact with the support surface. FIGS. 3A and 3B show a fourth configuration in which the scoop 120 is in the rearward position and the leg portions 136 of the first and second handles 112, 116 are in contact with the support surface.

The body 104 includes first and second opposing sidewalls each including a front sidewall portion, a back sidewall portion, and a middle sidewall portion. The middle sidewall portion may be taller than and between the front and back sidewall portions. The scoop 120 may be rotatably coupled to the middle sidewall portion of each of the opposite sidewalls of the body 104. The body 104 further includes a floor, a front end wall, and a back end wall. The front and back end walls cooperate with the first and second opposing sidewalls to define the interior of the body 104 that is usable for holding materials.

The scoop 120 includes an end portion and opposing sidewall portions that may be respectively disposed at least partially over the back end wall and the back sidewall portions of the body 104 when the scoop 120 is in the rearward position as shown in FIGS. 3A and 4A. The end portion and the opposing sidewall portions of the scoop 120 may also be respectively disposed adjacent the front end wall and the front sidewall portions of the body 104 when the scoop 120 is in the forward position as shown in FIGS. 1A and 2A.

The cart 100 may be configured such that when the scoop 120 is in the rearward position, at least a portion of the scoop 120 is below the back end wall of the body 104 and the scoop 120 does not completely block access to the interior of the body 104. As shown by a comparison of FIGS. 1A and 3A, a front of the cart 100 when defined by the scoop 120 in the forward position is taller than the front of the cart 100 when defined by the scoop 120 in the rearward position. The taller front of the cart 100 shown in FIG. 1A facilitates scooping, loading, and carrying in the scoop 120.

When the leg portions 136 of the first and second handles 112, 116 are in contact with a generally horizontal support surface, the cart 100 includes a generally vertical front bow defined by the scoop 120 in the forward position (FIGS. 1A and 1B), a floor of the body 104 is downward sloping or slopes downwardly from front to back, and an end portion of the scoop 120 is generally vertical. In addition, an upper rim of the cart 100 cooperatively defined by the scoop 120 in the forward position and the rearward portion of the body 104 slopes downwardly from front to back as shown in FIGS. 1A and 1B.

Figure 11A:
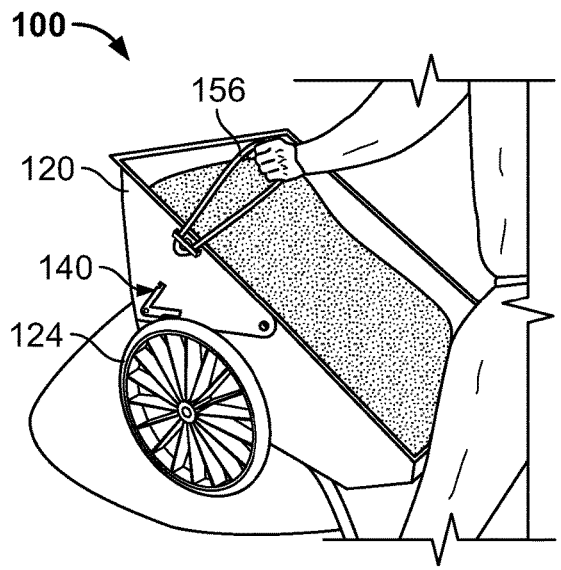
Figure 11B:
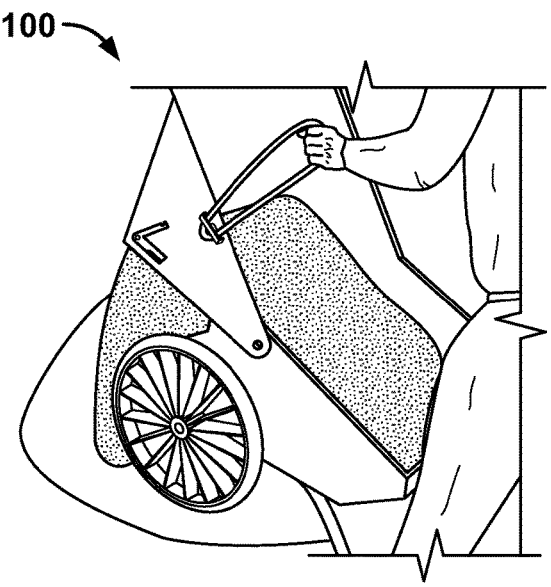

As shown by FIGS. 11A and 11B, the cart 100 is configured such that rotation of the scoop 120 from the forward position towards the rearward position allows materials to be released from the cart 100 generally under the scoop 120 through an opening created between the scoop 120 and the forward portion of the body 104.

The scoop 120 in the forward position and the first and second handles 112, 116 allow the cart 100 to be rebalanced for various load distributions by shifting hand positions along the first and second handles 112, 116 to thereby shift a center of mass of the material carried by the cart 100 and enable rebalancing of a load to reduce force/weight borne by the user and permit lifting and transporting heavier loads. For example, FIGS. 6A though 6C show the cart 100 with additional weight (e.g., adding 80 pounds to a 240 pound load, adding 150 pounds to a 330 pound load, etc.) added to three different locations in the cart 100, i.e., the front, middle, and back of the cart, respectively, to create an imbalanced load carried by the cart 100. FIGS. 6A, 6B, and 6C generally illustrate how the hand position may be changed along the handles 112, 116 (slid upward or downward) and the cart positioning may be changed to compensate (e.g., fully or mostly compensate, etc.) for the load. For example, this may include adapting the center of mass in each case to a location where there is virtually no weight or lifting force carried by the operator (e.g., despite 320 pounds being carried in the cart, etc.). FIG. 6A shows the cart 100 tipped or tilted slightly backward with a higher hand position along the handles 112, 116. FIG. 6C shows the cart 100 tipped or tilted slightly forward with a lower hand position along the handles 112, 116. FIG. 6B shows the cart 100 mostly level with a hand position along the handles 112, 116 that is lower than FIG. 6A but higher than FIG. 6B. FIGS. 6A through 6C generally show how the continuous handle and high bow design of the cart 100 in this configuration permits easy hand position adjustments to rebalance uneven loads. Accordingly, FIGS. 6A through 6C show the means for balancing or rebalancing a load carried by the cart 100 when the load shifts and/or when a portion of the load is unloaded from the cart 100.

As shown in FIGS. 1A and 1B, the body 104 includes a back end wall having a height lower than the scoop 120 in the forward position. The lower back wall of the body 104 allows easier loading and unloading of material to/from the interior of the body 104 overtop the back end wall of the body 104. The cart 100 has a generally flat top edge cooperatively defined by a top edge of the rearward portion of the body 104 and a top edge of the scoop 120 in the forward position. The generally flat top edge of the cart 100 allows for carrying a flat material (e.g., a wooden pallet in FIG. 12, long boards in FIG. 13, etc.) along the generally flat top edge of the cart 100. Positioning the flat material between the first and second handles 112, 116 may help to contain the flat material therebetween and prevent slippage of the flat material.

The scoop 120 in the forward portion provides the cart 100 with a high bow, is usable for scooping material into the cart 100 without using additional tools, and enables user body weight to better load and reload material in the scoop 120.

As shown in FIG. 2B, a rotatable joint between the body 104 and the scoop 120 does not contact the support surface when the scoop 120 is in the forward position and in contact with the support surface whereby a gap or air space 126 is between the rotatable joint and the support surface. The cart 100 may be configured such that an attack angle of a front end wall of the body 104 is steeper than an attack angle of the scoop 120.

The handle portions 132 of each of the first and second handles 112, 116 are configured to provide a wide range of handle positions and heights for a user of the cart 100. The first and second handles 112, 116 may be configured to provide a user with greater leverage for a given body weight thereby allowing a user to use less overall force to counterbalance a load in transport and to initiate lifting of the load off the support surface with the cart 100. In this example, each of the first and second handles 112, 116 may comprise a single member (e.g., round or square tubing, etc.) coupled to the body 104 that curves upwards from the leg portion 136 then back towards a front of the cart 100. This may allow a user to selectively adjust hand positions to rebalance the cart 100 for lifting, walking, tipping, or operating as a hand truck.

The first and second handles 112, 116 may be configured to be operable as a stop for the scoop 120 to inhibit rearward rotation of the scoop 120 beyond the rearward position. For example, the first and second handles 112, 116 may be configured such that the leg portions 136 are operable as a stop for the scoop 120 to inhibit rearward rotation of the scoop 120 beyond the rearward position. As shown in FIGS. 3A and 3B, the stop point for the scoop 120 may be at about the lowest point where the leg portions 136 contact the ground or other support surface.

The handles 112, 116 may be configured to be removed and fit within the body 104 of the cart 100 for ease of shipping, etc. The wheels 124 and 128 may further be configured to be removed and fit within the body 104 of the cart 100 for ease of shipping, etc. The scoop 120 nests closely along the outside of the body 104. Accordingly, the cart 100 may thus have a relatively compact size for packaging and make it commercially viable for shipping.

The cart 100 may be configured such that only a small portion of a load carried by the cart 100 will be forward of the axle thereby inhibiting the cart 100 from accidentally tipping over/forward when the leg portions 136 of the first and second handles 112, 116 are in contact with a horizontal support surface or when the cart 100 is being rolled along the support surface.

A width of the cart 100 may be greatest along a top edge cooperatively defined by the body 104 and the scoop 120. The body 104 is narrower near the bottom, and the overall cross section (including the scoop 120 when placed in the front) would continue to flair out or widen such that the widest points of the cart body 104 and scoop 120 would be the top edge. For example, the top edge may be wider than and extend outwardly beyond the wheels and side handles of the latches. Thus, if the cart is moved through a door or other tight spot, the widest top edge would bump the sides instead of the wheels or latches thereby protecting the latches from damage and helping push and center the cart through the opening versus a wheel hitting, for example, and stopping the cart.

The scoop 120 may be detachable from and reattachable to the cart 100. The scoop 120 may be rotatable about 180 degrees relative to the body 104 between the forward and rearward positions. The scoop 120 may have a generally triangular or wedge shaped side profile.

The cart 100 may be configured to allow load rebalancing and changes forward and rearward relative to the axle by reconfiguring the cart 100 into the plurality of different configurations, whereby portions of a load in front of and behind the axle are offsetting and help to counterbalance the load. The cart 100 may be configured such that a center of mass of a load carried by the cart 100 is at about the axle when the cart 100 is level and shifts significantly rearwards when the cart 100 is rotatable relative to the support surface such that at least a portion of the load is behind the axle, which offsets or counterbalances some of the load. The cart 100 may be configured such that a weight of the scoop 120 when in the rearward position helps to counterbalance and offset the load and helps to initiate lifting the load off the support surface with the cart 100.

The cart 100 is usable as a hand truck having a first length when the scoop 120 is in the forward portion and a second length when the scoop 120 is in the rearward position that is shorter than the first length. The cart 100 may be loaded with the scoop 120 in the forward position. The load may be transported with the cart 100 generally horizontal. The scoop 120 may be rotatable from the forward position to the rearward position during transport to allow a stack of materials to be unloaded from the cart 100 as a stack and without having to unstack the stack of materials. The scoop 120 may also be rotated from the forward position to the rearward position when the cart 100 is being used to transport a large, heavy object to thereby extract the longer deck embodied by the scoop 120 from under the object after resting the cart 100 back on the ground after transport.

Figure 9A:
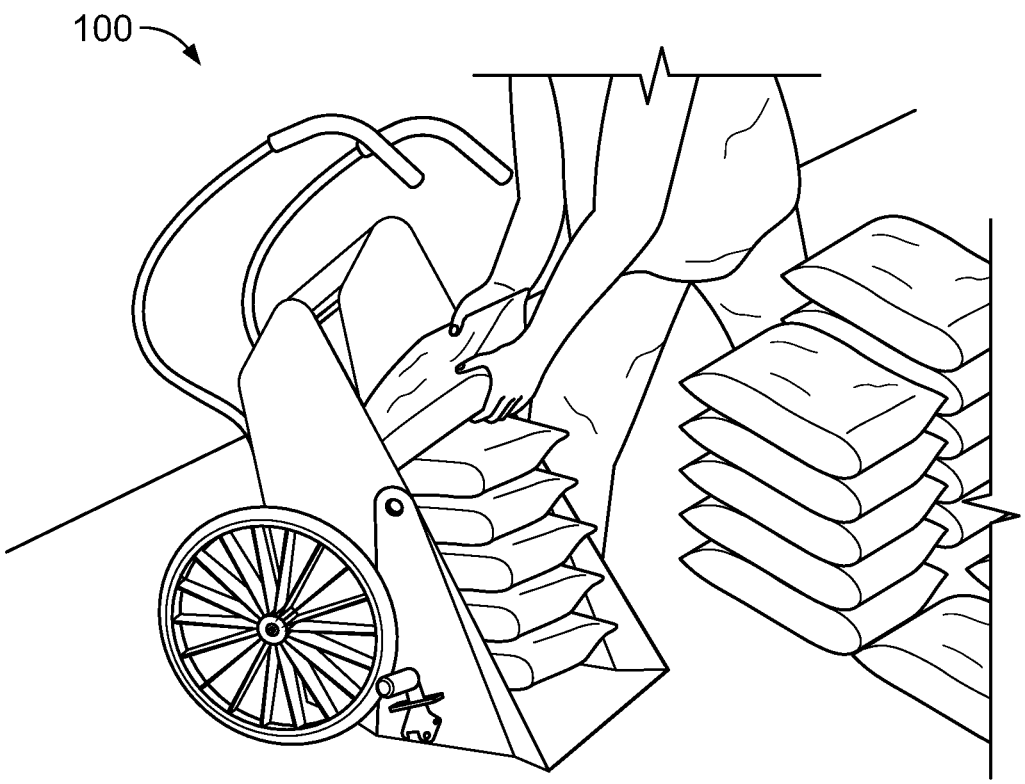
Figure 9B:
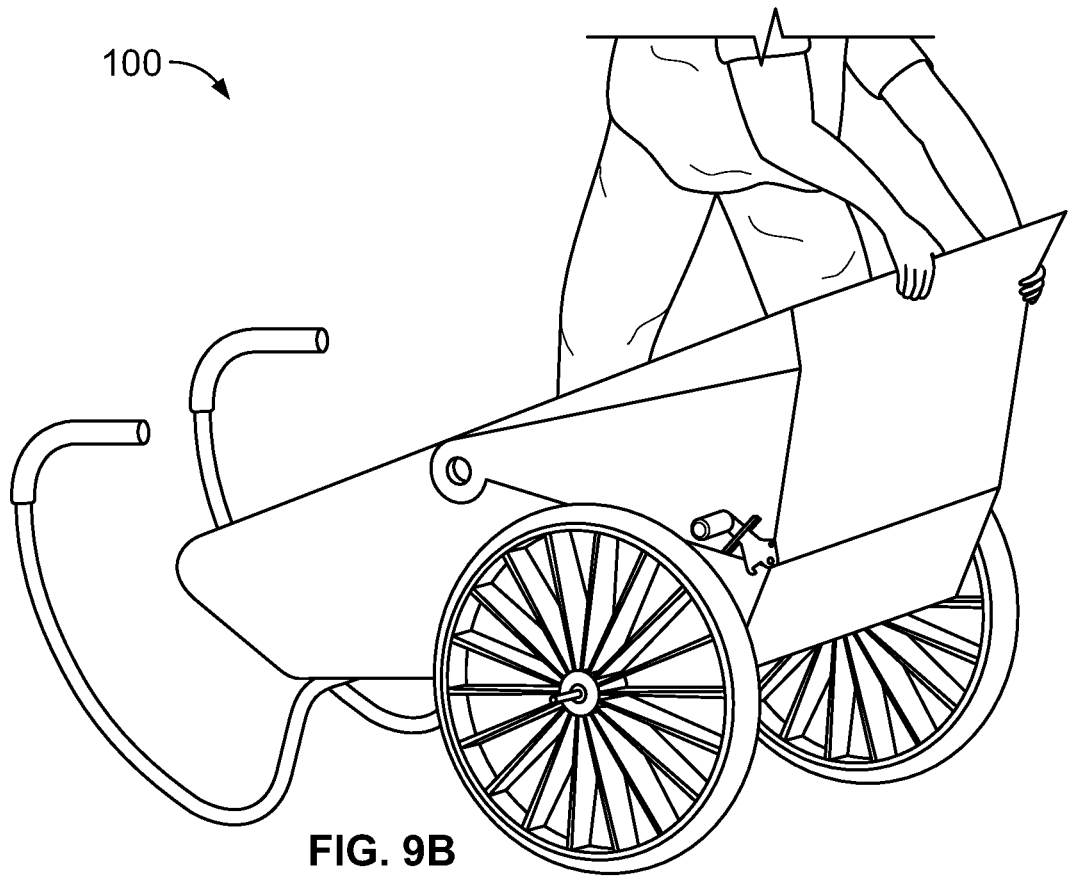
Figure 9C:
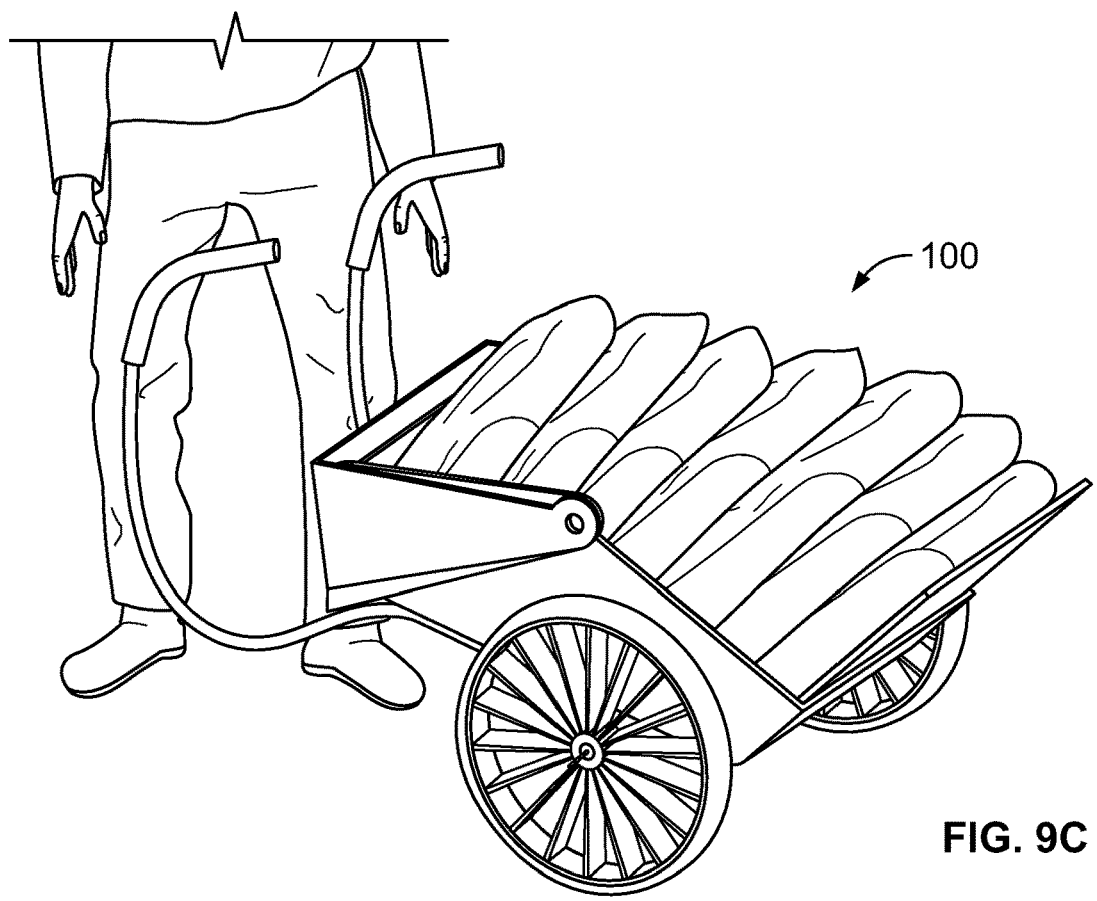
Figure 9D:
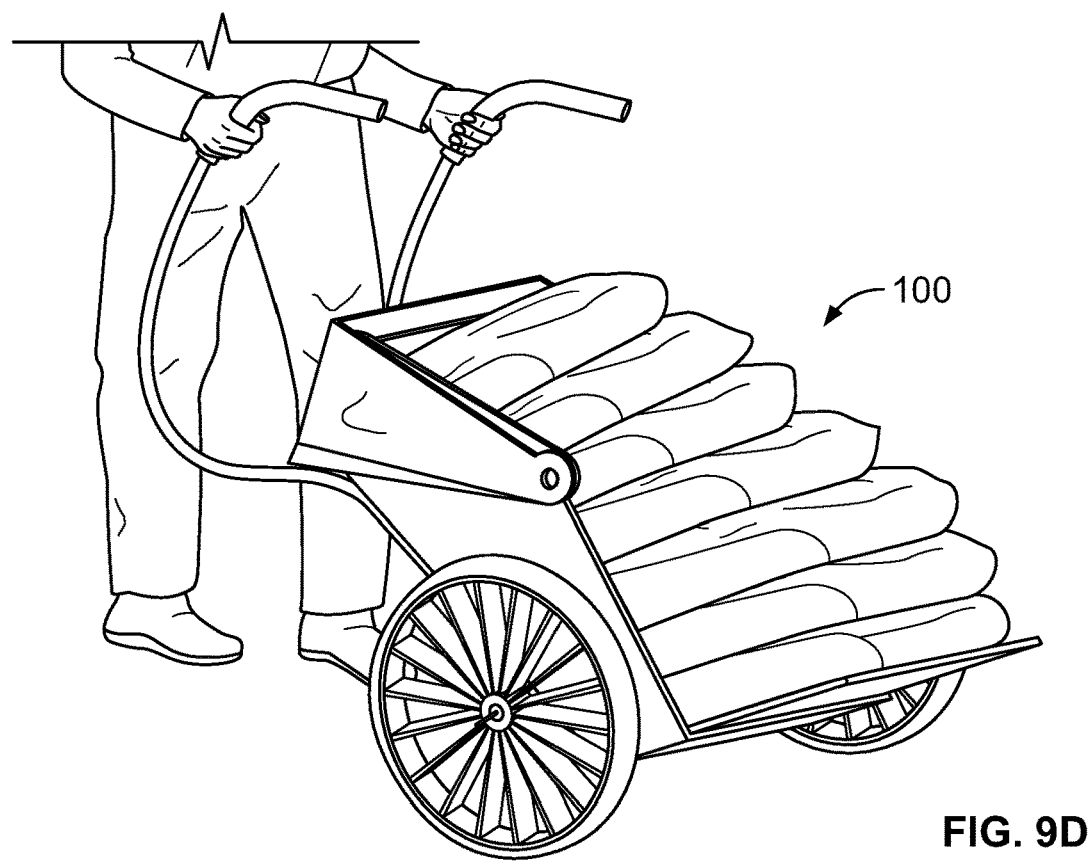

For example, FIG. 9A shows the cart 100 being loaded with a stack of materials (e.g., bags of mulch, etc.). FIG. 9B shows the loaded cart 100 at rest after tipping the cart 100 backwardly such that the cart's leg portions 136 contact the ground. By way of example, the operator may tip the loaded cart 100 backwardly similar to a hand truck by grabbing both handles 112, 116 (or by grabbing a single handle 112 or 116 and back wall of the cart body 104) and pulling backwardly with a foot on the axle to prevent the cart 100 from rolling backward. FIG. 9C shows the loaded cart 100 at rest after the scoop 120 has been rotated to the rearward, fully retracted, or stored position. When the cart 100 is at rest (FIG. 9B) or during transport (FIG. 9C), the scoop 120 will be easier to rotate from the forward position to the rearward position as there will be less (or no) pressure or friction on the scoop 120 from the loaded materials as the weight of the loaded material will be at least partially (e.g., entirely, mostly, etc.) on the floor of the cart body 104. FIG. 9D shows the loaded cart 100 being transported to a location at which the stack of materials may be unloaded from the cart 100 as a stack without having to unstack the stack of materials. The stack of materials may be unloaded after tipping the cart 100 forward until the cart body's front wall contacts the ground (see for example FIG. 4A) and then moving the cart 100 backwardly to pull the cart body's short front wall out from under the stack of materials.

Figure 8B:
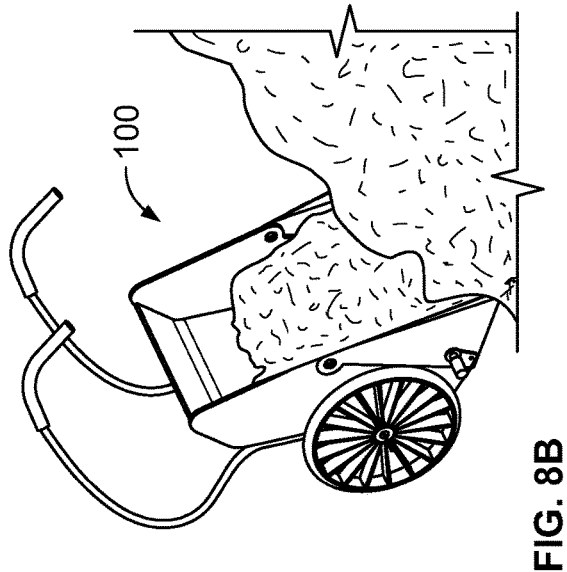
Figure 8D:
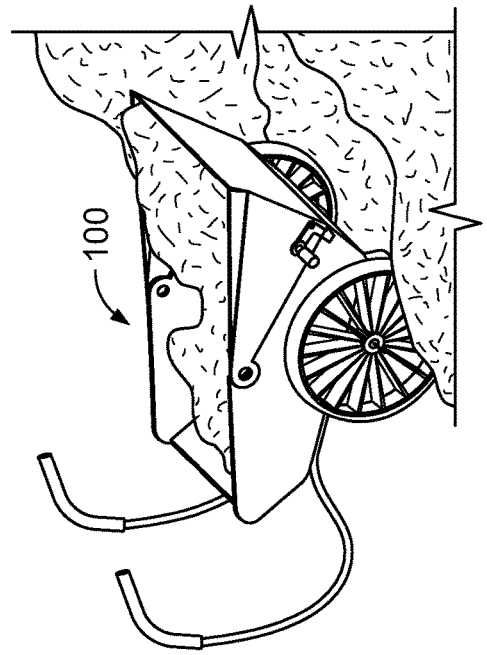
Figure 8A:
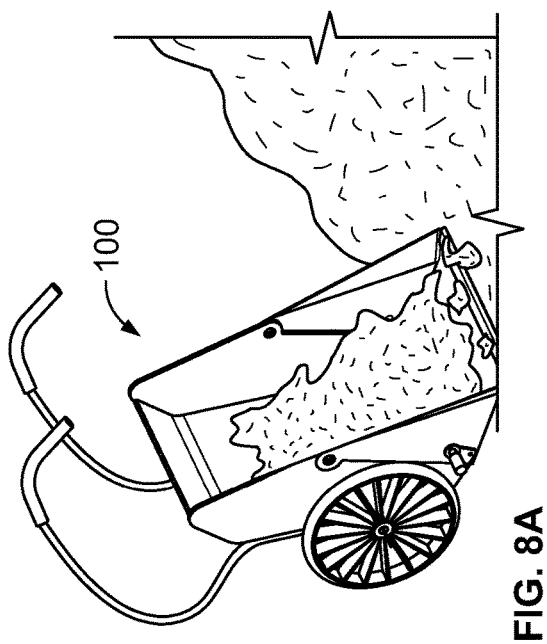
Figure 8C:
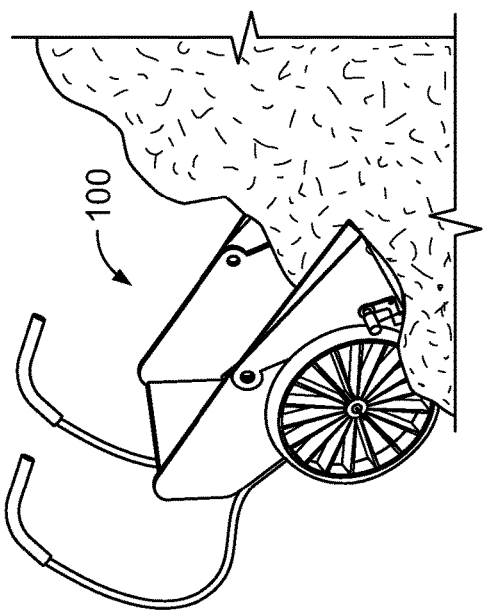

The scoop 120 in the forward position may be usable for scooping materials into the body 104 of the cart 100 without using hand tools and for transferring at least a portion of the materials towards a back of the cart 100 as the cart 100 is rotated backwardly. For example, FIGS. 8A and 8B show material (e.g., snow, etc.) being loaded into the scoop 120 without using a shovel by rolling the cart 100 forward to push the scoop 120 into the material. FIGS. 8C and 8D show the cart 100 being tipped backwardly whereby the scoop 120 lifts and transfers (e.g., throws, tosses, redistributes, etc.) at least a portion of the material towards a back of the cart 100.

The cart 100 may be configured such that a footprint of the cart 100 is shorter when the scoop 120 is in the rearward position than when the scoop 120 is in the forward position and such that the cart 100 is more maneuverable when the cart 100 has the shorter footprint. As shown in FIG. 3A, the body 104 includes low front and back end walls for loading and unloading access at a front and a back of the cart 100 when the scoop 120 is in the rearward position. The scoop 120 includes a generally rectangular end portion and generally triangular opposing sidewall portions. The scoop 120 in the forward position and the rearward portion of the body 104 cooperatively define generally triangular opposing sidewalls of the cart 100 as shown by FIG. 5A.

As shown in FIG. 10, the cart 100 may further include a latching mechanism or assembly 140 for releasably coupling the scoop 120 in the forward position to the forward portion of the body 104. The latching mechanism 140 includes first and second side latches 144 along opposite sides of the cart 100 and a connecting rod 148 (broadly, a connecting member) between the first and second side latches 144 that enables the latching mechanism 140 to be unlatched or latched by either one of the first and second side latches 144.

Holes 152 are defined in the brackets of the first and second side latches 144, which may be used for attachment of a strap 156 as shown in FIGS. 11A through 11D. More specifically, FIGS. 11A and 11B show the exemplary manner by which the scoop 120 may be unlatched and rotated from the forward position by the operator pulling the strap 156 from behind the cart 100 while the cart 100 is at rest with the cart's wheels 124, 128 and leg portions 136 in contact with the ground, or other support surface. Accordingly, the latching mechanism 140 may be released from any one of three different positions, e.g., from behind the cart 100 using the strap 156 or from either side of the cart 100 using the corresponding first or second side latches 144.

Figure 11C:
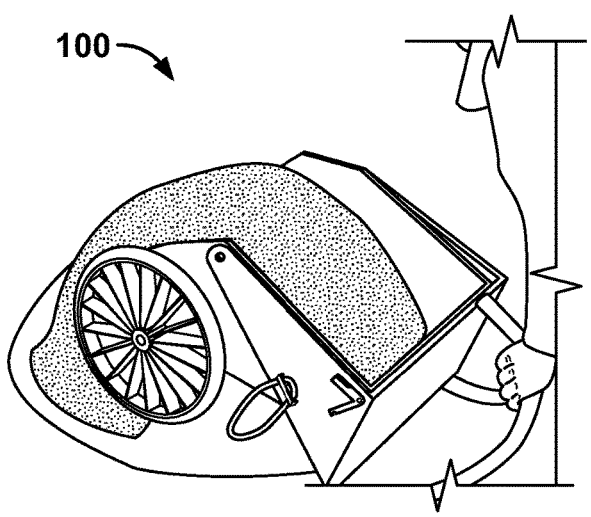
Figure 11D:
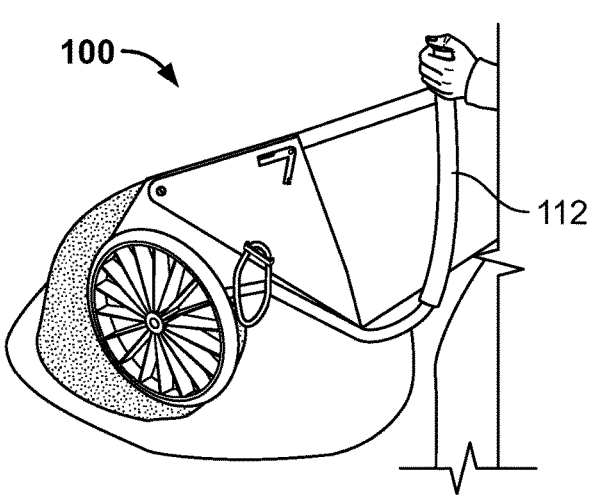

When the cart 100 is at rest or during transport, it will be easier to rotate the scoop 120 to the rearward position as there will be less (or no) pressure or friction on the scoop 120 from the loaded materials as the weight of the loaded material will be at least partially (e.g., entirely, mostly, etc.) on the floor of the cart's body 104. FIG. 11B also shows a portion of the material being released under the scoop 120 through the opening created by the rotation of the scoop 120, where the opening is between the scoop 120 and the forward portion of the body 104. FIG. 11C shows the scoop 120 in the rearward, fully retracted, or stored position. FIG. 11D shows the remaining material being dumped from the cart 100 by lifting the cart handles 112, 116 to tip the cart 100 forward. With the scoop 120 in the rearward position, the front of the cart 100 has a relatively short front wall defined by the body 104 with a relatively shallow angle that makes it easier to dump or deposit the remaining material from the cart 100.

With continued reference to the figures, FIGS. 1A and 1B show the scoop 120 in the locked or latched forward position in which the cart 100 is configured for holding, carrying, and transporting a maximum amount of material. For example, the cart 100 may have a maximum carry capacity of about 9 cubic feet when the scoop 120 is in the forward position. But the cart 100 may also be configured to have a maximum carrying capacity greater than or less than 9 cubic feet in other exemplary embodiments. For example, another exemplary embodiment of the cart may be configured to have a maximum carrying capacity of about 6 or 7 cubic feet when the scoop is in the forward position. In FIGS. 1A and 1B, the cart 100 is shown in a loading/loaded or at rest configuration with the cart's leg portions 136 in contact with the ground (broadly, support surface).

FIG. 1A also shows the cart 100 in a configuration in which materials (e.g., flat sheet-type materials, plywood, a wooden pallet, etc.) could rest on top of the cart 100 for transporting or using as a work surface. For example, FIG. 12 shows a wooden pallet 168 being transported by the cart 100 where the wooden pallet 168 is positioned on top of the cart 100. FIG. 13 shows boards 172 being transported by the cart 100 where the boards 172 are positioned on top of the cart 100 and between the cart's handles 112, 116. As shown by FIGS. 12 and 13, the cart 100 may be rolled along the ground by pushing both handles (FIG. 12), by pulling a single handle (FIG. 13), etc.

In FIGS. 2A and 2B, the scoop 120 is in the forward position and in contact with the ground. The body 104 of the cart 100 is generally upright relative to the ground. The cart 100 may be loaded by pushing, raking, shoveling, etc., material into the scoop 120 and body 104 of the cart 100 with very little lifting of the material. Prior to tipping or tilting the cart 100 backwardly and lifting the load, the load may be shifted to some degree by rotating the scoop 120 from the forward to rearward position whereby the weight of the scoop 120 may help to counterbalance and offset the load and help to initiate lifting the load off the ground with the cart 100. The configuration of the cart 100 shown in FIGS. 2A and 2B may also be used when unloading material from the cart 100, such as by raking or pulling material out of the cart 100 and/or by releasing the latching mechanism 140 to release the scoop 120 and lifting the scoop 120 to release material out of the cart 100 quickly and/or at one location. The cart 100 configuration shown in FIGS. 2A and 2B may also be used for carrying bulky loads (e.g., bales of hay, bags of soil, fertilizer, fire wood, etc.) whereby the cart 100 may be used similar to a long-deck hand truck.

FIGS. 3A and 3B show the cart 100 after the scoop 120 has been rotated to a rearward, fully retracted, or stored position, e.g., for easy unloading from the front or back of the cart 100, or dumping, etc. The cart 100 is more or less horizontal in a four-point stance in which the cart 100 is resting on its wheels 124, 128 and leg portions 136, which are in contact with the ground or other support surface. In this configuration, the cart 100 may be unloaded from the front as shown in FIG. 3B or from the back. With the scoop 120 in the rearward position, the cart 100 has a smaller effective cart size as the cart 100 is slightly shorter and with a reduced cubic feet carrying capacity than when the scoop 120 is in the forward position. The cart 100 also has relatively low front and back walls for easy access with a digging tool.

FIGS. 4A and 4B show the cart 100 after the cart 100 has been tipped forward such that the cart 100 is in an unloading configuration and/or a configuration in which the cart 100 is usable as a short-deck hand truck for heavy or very dense objects. The cart 100 is shown in FIG. 4A in a generally vertical position or hand truck configuration in which the scoop 120 is in the rearward or stored position such that the cart 100 has a shorter deck or toe plate for loading the cart 100. FIG. 4A also shows the configuration of the cart 100 at the end of a sequence in which materials have been fully removed, dumped, or deposited from the cart 100.

FIGS. 5A through 5E include a sequence of side profiles of the cart 100 with the scoop 120 in various positions as the scoop 120 rotates from the forward or scooping position (FIG. 5A) to the rearward, fully retracted, or stored position (FIG. 5E). The scoop 120 is relatively easily reconfigurable or rotatable through the range of motions from FIG. 5A to 5E as the scoop 120 is the only primary moving component without any detachable parts in this exemplary embodiment. The angle between the two portions 130 and 134 of the scoop 120 may be about 90 degrees as shown in FIG. 5C, which may provide the scoop 120 with the ability to nest when in the rearward, fully retracted position shown in FIG. 5E.

FIGS. 7A, 7B, and 7C show the cart 100 being used for a transporting a loose material, such as mulch, etc. More specifically, FIG. 7A shows a user pushing the loose material (e.g., using a pitch fork, shovel, etc.) into the cart 100 with the cart 100 tipped forward and the scoop 120 in the forward position. FIG. 7B shows the loaded cart 100 being tipped rearward. FIG. 7C shows the loaded cart 100 ready for transport.

In exemplary embodiments, a cart may be provided with one or more extra components or accessories. By way of example, exemplary embodiments of a cart may include one or more of the following accessories: (1) snow clearing or gravel digging insert to create a sharper leading digging edge as well as a more sloped angle on the inside wall of the front of the scoop—to assist in scooping then throwing or toppling materials to the rear of the cart; and/or (2) center self-locking/releasing mechanism; and/or (3) storage trays, slots, or clips both around the legs/handles or underneath the cart body; and/or (4) straps and attachment points for straps to be used in hand truck functions; and/or (5) the short deck forming the hand truck deck/bed might be curved or similarly shaped such that the front edge extends farther to enable easier insertion under heavy objects such as plant pots with a corresponding shape on the matching side of the scoop that contacts it; and/or (6) a strap stored and readily retractable to secure bulky or heavy items being transported; and/or (7) a work and clamp surface that installs on the cart to facilitate construction tasks, sawing, or other tasks; and/or (8) a wood rack (for bagged fuel, fertilizer etc. as well) that is configured to fit inside the cart and thus can enable depositing a fully stacked load of firewood or bagged materials without manual unloading (though to some degree with that ability to deposit stacked bags exists without such insert); and/or (9) a smaller vessel or bin that fits into the back of the cart (that might also be configurable and held between the cart legs/handles) that enables operators to keep two types of materials separate during work (e.g., mulch separate from soil or weeds, etc.).

FIGS. 14A and 14B illustrate an exemplary embodiment of a cart 200 including a trough or drop-in tub 274. The trough 274 may be used to hold a material (e.g., weeds, etc.) and keep it separate from another material (e.g., soil, etc.) within the cart 200. FIG. 14A shows the trough 274 positioned (e.g., nested, etc.) within the body 204 of the cart 200 with the scoop 220 in the forward position. FIG. 14B shows the trough 274 coupled to the cart's handles 212, 216 with the scoop 220 in the rearward position.

FIGS. 15A and 15B illustrate an exemplary embodiment of a cart 300 including a bag holder 376. The bag holder 376 may be coupled to (e.g., clipped onto, etc.) the back wall of the body 304 when the scoop 320 is in the forward position and the cart 300 is generally upright. The bag holder 376 may be used to hold a bag upright and open. The bag holder 376 might be stored within the tray 580 shown in FIG. 17A.

FIGS. 16A and 16B illustrate an exemplary embodiment of a cart 400 including a hitch 478. The hitch 478 may include an opening for a trailer ball to allow the cart 400 to be hitched to a vehicle.

FIGS. 17A through 17G illustrate an exemplary embodiment of a cart 500 including a tray 580 with a tool holder according to an exemplary embodiment. The tray 580 is slidable relative to the body 504 of the cart 500 between the handles 512, 516. The tray 580 is slidable between an open position (FIG. 17A) and a closed position (FIGS. 17B through 17G). The front portion 581 of the tray 580 includes a plurality of tool holders (e.g., openings, etc.) that remain exposed for easy access tool storage even when the tray 580 is closed. In the closed position, the front exposed portion 581 of the tray 580 is within a footprint of the body 504 and/or all or mostly underneath the overhang of a rear end wall 585 of the body 504 (FIG. 17D). An all-weather cover, etc. may be stored in the tray 580. The rear end wall 585 of the body 504 and front portion 581 of the tray 580 may be sloped or angled respectively upwardly and downwardly.

As shown in FIGS. 17E through 17G, the exposed front portion 581 of the tray 580 may be offset to be higher up, e.g., where it will be less likely to be hit by the user's heel, etc. As shown in FIG. 17E, the exposed front portion 581 may form a tubular hollow section that matches the angle of the rear end wall 585 of the cart 500. The tray 580 may include various features, such as slots and holes for holding tools, a cup holder, a twine spool holder or insert, built in cutter, electric cord brackets, etc. For example, a spool for twine may be positioned horizontally within the interior of the tubular exposed section where the spool mounts on a spindle or holder within the tubular exposed section 581. The tubular hollow shape and end caps 587 may have one or more chambers for storing parts and for keeping the parts dry and organized. The tubular shape is conducive to storing items therein and also provides the ability to better grab and hold (e.g., via friction rubber grommets, etc.) the tools that are inserted in through the top, angled exposed end portion 581 of the tray 580 for easy access. The tools may be grabbed at two locations, e.g., along the top edge and bottom edge of the exposed portion 581 of the tray 580, etc. The working angle on top of the exposed tubular section 581 of the tray 580 may be roughly no shallower than perpendicular to the cart body rear wall 585, which may help to keep the tools tipped up a bit more to inhibit the tools from bouncing out.

The tray 580 may be used for carry a wide variety of items and can be made from various materials. As shown in FIG. 17H, the tray 580 may include a bottom wall 589 made of mesh or other suitable material that allows debris, liquid, etc. to pass through and also allows an airflow that helps to keep the tray interior and its contents dry.

FIGS. 18A and 18B illustrate an exemplary embodiment of a cart 600 including a work station. As shown in FIG. 18A, the work station may include a clamp 682 and a clamp surface 684. A flat material 686 (e.g., plywood, etc.) may be clamped atop the cart 600 between the clamp 682 and clamp surface 684. The work station may be installed on the cart 600 to facilitate construction tasks, sawing, or other tasks.

FIG. 19 illustrates an exemplary embodiment of a cart 700 including a kickstand 788. The arrow indicates how the kickstand 788 may be rotated between the deployed position and the retracted position. In the retracted position, the kickstand 788 is alongside the handles 712. In the deployed position, the kickstand 788 contacts the ground or other support surface to help level the work surface 786 held on top of the cart 700 by the clamp 782. The kickstand 788 may also help to prevent rolling of the cart 700.

FIGS. 20A and 20B illustrate an exemplary embodiment of a cart 800 including a strip or insert 880 positionable along a forward edge of the scoop 820. The strip 880 may be configured (e.g., made of a durable material, etc.) to cover and thus protect the leading edge 822 of the scoop 820 when the scoop 820 is being moved (e.g., scraped, etc.) along the ground while loading the cart 800. Additionally, or alternatively, the strip 880 may be configured to create a sharper leading digging edge along the front of the scoop 820 and a more sloped angle on the inside wall of the front of the scoop 820 to assist in scooping and then throwing or toppling materials to the rear of the cart 800.

FIGS. 21A, 21B, 21C, and 21D illustrate an exemplary embodiment of a cart 900 including a wood rack 982. As shown by FIGS. 21A and 21C, the wood rack 982 is configured to be positioned within the interior of the cart 900 that is cooperatively defined by the cart's body 904 and the scoop 920 in the forward position while the cart 900 is upright or tipped forward such that the scoop 920 is in contact with the ground. The wood rack 982 may include a curved outer wall 983. The curve or curvature of the outer wall 983 may be configured to match or correspond with the rotational path of the front edge of the scoop 920 between the forward and rearward positions and/or with a line transcribed by the swing of the lower front edge of the scoop 120 through its rotation. The outward curvature of the outer wall 983 helps to increase the wood-carrying capacity of the rack 982.

The wood rack 982 may be fully loaded with wood before or after the wood rack 982 is positioned within the interior of the cart 900. The cart 900 may be tipped rearward and rolled to a new location (see, for example, FIGS. 6A through 6C) at which the wood rack 982 and wood therein will be unloaded. During transport, the scoop 920 may be rotated to the rearward position which will be easier as there will be less (or no) pressure or friction on the scoop 920 from the wood as the weight of the wood will be at least partially (e.g., entirely, mostly, etc.) on the floor of the cart body 904. At the unloading location, the cart 900 may be tipped forwardly (e.g., into a kneeling position, etc.) until the end portion or tip of the body's front end wall contacts the ground. As shown in FIGS. 21B and 21D, the wood rack 982 and fully stacked wood therein may be unloaded from the cart 900 as a unit without having to unload the wood piece by piece.

FIGS. 22 and 23 illustrate an exemplary scoop 1020 that may be used with a cart (e.g., 100, 200, 300, 400, 500, 600, 700, 800, 900, etc.) disclosed herein according to exemplary embodiments. FIGS. 24 and 25 provide exemplary dimensions (in inches and degrees) for the scoop 1020. But these dimensions are examples only as the scoop 1020 may be configured differently (e.g., with a larger or shorter length, width, height, larger or smaller angles, etc.) in alternative embodiments. The holes 1031 may be used for rotatably (e.g., hingedly, pivotally, etc.) coupling the scoop 1020 to the body of a cart. In addition, the oval-shaped openings 1033 and circular holes 1035 in the sides of the scoop 1020 shown towards the bottom in FIG. 22 may be used for mounting components of a latching mechanism (e.g., latching mechanism 140 shown in FIG. 10, etc.). Alternative embodiments may be configured differently for mounting components of a latching mechanism, e.g., at a different location, via other mounting means (e.g., welding, etc.), etc.

FIGS. 26 and 27 illustrate an exemplary body 1104 that may be used with a cart (e.g., 100, 200, 300, 400, 500, 600, 700, 800, 900, etc.) disclosed herein according to exemplary embodiments. FIGS. 26 and 27 also provide exemplary dimensions (in inches and degrees) for the body 1104, such as when the cart 100 is configured with a maximum carrying capacity of about 9 cubic feet when the scoop 120 is in the forward position, etc. But these dimensions are examples only as the body 1104 may be configured differently (e.g., with a larger or shorter length, width, height, larger or smaller angles, etc.) in alternative embodiments.

FIGS. 28A and 28B illustrate how a portion of the load within an interior of a cart 1200 shifts relative to the axle 1294 at the different configurations of the cart 1200 according to exemplary embodiments. The cart's interior is cooperatively defined by the body 1204 and the scoop 1220 in the forward position. The dashed lines 1295, 1296, 1297 emanate from the axle 1294 and help to illustrate the uniqueness of the geometry in combination with the load-rebalancing aspects of exemplary embodiments of the present disclosure. The various lines 1295, 1296, 1297 show the range of changes in the load that is in front of or behind the axle 1294 depending on which configuration or position the cart 1200 is in. Each line represents a vertical line for a particular cart configuration (e.g., at rest 1295, level 1296, kneeling 1297, etc.) where the portions of the load within the cart 1200 that are on the right and left sides of the vertical line 1295 (FIG. 28A), 1296, or 1297 (FIG. 28B) are offsetting one another for balancing.

FIGS. 28A and 28B show the volumes of materials that can be held in the various sections of the cart 1200. The lines 1297 and 1299 show the two extremes of ground positions when the cart 1200 is resting with the leg portions of the handles and wheel in contact with ground 1298 (FIG. 28A) and when the cart 1200 is in hand truck mode or kneeling position with the scoop 1220 in contact with the ground 1299 (FIG. 28B). The lines 1295 and 1297 represent the vertical lines associated with the cart 1200 at rest (FIG. 28A) and in the hand truck mode 1297 (FIG. 28B). The line 1296 represents the approximate vertical line for the cart 1200 during transport/walking with the top of the cart 1200 horizontal. In the hand truck position shown in FIG. 28B, the line 1297 indicates that some of the mass will be behind the axle 1294. This will help the cart 1200 be more efficient than a traditional hand truck in which the mass is usually not only in front of the axle but also in front of the wheels of a traditional hand truck.

FIG. 28A shows that only a relatively small portion of the load is ahead of the "at rest" line 1295 when the cart 1200 is at rest with the rear body lower and the front bow nearly vertical (e.g., see FIG. 1B, etc.). This makes it very unlikely that the cart 1200 would accidentally tip forward which is a regular occurrence for conventional square garden carts. As disclosed herein, the load may be rebalanced to reduce or eliminate the force or load on the user's hands. The load may also be rebalanced such that a negative weight is created on the user's hands such that the user would then lean on the handles while walking and balancing the cart 1200.

The cart top can be level while a user is walking with the cart 1200. This allows the cart 1200 to be fully loaded to the brim without having materials spill out of the cart 1200 while the user is walking with the cart 1200 with the top edge level. This is unlike conventional wheelbarrows and carts that have a "walking" position tipped forward such that materials will bounce or shake out as the user walks with the convention wheelbarrow or cart.

In exemplary embodiments, the side profile of the cart may roughly have a widened triangular shape. The main cart body portion might have a high point in the middle with the front and rear portions significantly lower, such that the mid-point, where the scoop is attached and pivots from, is the high point of the cart body (the tallest/side wall point). This general shape of the main body, where the front edge and rear wall are lower permits three important functions: (1) the short front edge/wall forms the deck or plate for the 'short-deck' hand truck function for lifting heavy or dense objects, but also allows easy access for shoveling or removing materials from the bin, by accessing from the front; (2) when fully emptying the cart body, the short wall in the front enables materials to be dug out easily or released more fully and easily/quickly when the cart is tipped forward onto the front edge—tipping the handles more or less upright; and (3) in the rear where the operator more often stands roughly on either side of or between the handles.

In exemplary embodiments, the cart may be configured to be operated in several primary positions and orientations, which may generally fall into one of five basic categories: (1) loading with the scoop or nose in its forward or locked position and the device angled or tipped forward and down, such that the scoop is roughly in contact with the ground or surface; (2) the nose forward and the body more or less horizontal as in during transport (e.g., of material(s), etc.) or being rolled on two wheels; (3) with the scoop in the rearward, fully retracted, or stored position and the cart resting on the two wheels and legs—where the effective size or capacity of the cart is substantially reduced (this position also occurs while dumping a portion of the load, when the scoop is lifted and the material contained therein is released with the cart now accessible with a shovel or other tool from both the front and rear); (4) with the nose stored and the cart front end tipped forward so the handles are more or less upright, thus in the "hand truck" position (also referred to as the loading/transport position for use as a short-deck hand truck (this is also the ending position for dumping the final materials from the cart); and 5) similar to the position and use as 'short deck' (or short toe plate as they are sometimes referred to) hand truck with the scoop in the forward position, which enables the cart to work as a long deck (or longer toe plate or bed) hand truck for bulky items.

In an exemplary embodiment, the scoop might comprise approximately ⅓ of the cart's overall carrying capacity (e.g., measured in cubic feet, etc.) and in its resting position enables carrying of the materials loaded in the cart on average, more centered (or closer to) the axle, providing more load management and control with less exertion. The cart may be configured to have a high bow defined by the pointed end or tip of the scoop that is nearly a vertical front edge when the cart is at rest on both wheels and legs. This high bow vertically concentrates the mass of the materials contained in the cart (including the scoop) closer to the axle where less force is needed to rebalance the load (a lower moment of inertia). The combination of high bow (where materials are less distributed horizontally away from the axle) along with the elongate (e.g., continuous, etc.) handles are part of what allows the cart to be rebalanced for various distributions of weights in the cart. Shifting the hand position on the handles (lifting them more or less) significantly shifts the center of mass to enable rebalancing loads to reduce force/weight borne by the operator and permit lifting and transporting heavier loads. This repositioning is partially enabled by the resting position of the cart in which the cart body/floor is sloped from front to back. This lower rear portion of the cart enables the scoop or bow portion to essentially rotate farther back to shift the center of gravity rearward, and thus gives a greater potential range of motion when lifting the cart for transport to rebalance the load to take pressure and weight off the hands and body of the operator. The handles and the cart as a system thus enables a full range of motion from where the cart is at rest, to the rear of the cart lifted (with the scoop nearly on the ground) to adjust the balance to enable easier transport of the load or object being carried —essentially seamlessly transitioning as needed from cart to hand truck.

The cart configuration allows more material to be carried in the scoop and forward part of the cart alone (with a forward imbalanced load). The sloped resting position, which results in a higher, steeper bow when the cart is at rest, also shifts the center of mass rearward while the cart is at rest, which greatly reduces the likelihood of such a forward-loaded cart of tipping forward on its own from the load imbalance. This ability to substantially adjust the balance point and reduce work and lifting force on the operator (even to zero) is helpful when handling very heavy loads. The high bow and sloped body also enables the cart to be loaded without separate hand tools (e.g., shovels, etc.). Specifically, the scoop can be used to dig loose materials, such as gravel or snow, and then transfer or throw a portion of that load towards the rear of the cart as the cart is dropped back onto its legs into the at rest position. This process can be repeated such that with several scoops most of the cart can be filled in this manner. The throwing, tossing, or projecting materials from the scoop to the rear portion of the body is facilitated in combination with features described herein including the high, large bow of the scoop, the rear-sloping floor of the cart body, and the elongate continuous handles/legs, that allow the scoop to be used as an over-sized shovel blade to load the cart by a single or repeated process of digging and tipping the load to distribute and rebalance the load dynamically.

The steep or high bow (e.g., the nearly vertical slope/angle of the front edge) of the scoop also translates into a shorter footprint for a given size/carrying capacity cart and shorter overall length. There are also several additional implications (assuming holding carrying capacity constant): (1) it allows positioning the load farther rearwards towards and over the axle/balance point (after scooping material when possibly more or most of material in the cart is in the forward area or under the scoop, then the cart would be less prone to tip forward); and (2) the steeper and higher scoop also transports the loaded material through a greater range of motion when lifting after scooping (closer to 90 degrees—from flat on the ground to nearly vertical). One of the beneficial results from this geometry (and large scoop) is that as the load is lifted closer to vertical (and loaded material even past vertical) the material thus also is more prone and can be induced to tumble or disperse backwards and be distributed more so over the entire cart or body (to more fully/evenly fill the cart and avoid an unbalanced cart that might tip forward). This scoop-and-tip sequence can enable filling certain materials (e.g., gravel, snow, etc.) into the cart without the use of hand tools, such as shovels; (3) tends to prevent material being transported to escape over the bow or tip of the scoop during transport when the handles are lifted, which is unlike most conventional carts or wheelbarrows, the cart tends closer towards fully level for when being transported; (4) also enables more materials being transported to be dispersed or deposited if the scoop is released and rotated back towards its stored position; and (5) enables heavy loads to be rebalanced in order, for example, to reduce or eliminate the lifting force and work by the operator. The high bow and materials concentrated there, reduces the moment of inertia of the combined cart plus load versus other carts (where the load is more spread on either side of the axle), and average load over and near the axle (and the ability of the operator to shift and control the balance point by rotating the cart and shifting the hand grips on the handles, as intended). It also improves the ability of the operator to retract the scoop by requiring less effort/force on it to initiate retraction of the scoop, especially with the cart in its 'at rest' position with both wheels and legs (or legs near the ground), as in that position the load is more shifted backwards away from the scoop (and the scoop being nearly vertical in its at rest position, it therefore greatly reduces the force on the inside of the wall of the scoop that could resist its retraction/rotation). In other words, the force is closer to perpendicular to the direction of scoop rotations when pulling on a handle or strap attached to the top edge of the scoop.

Such a vertical position of the scoop at rest also positions the load of the materials in the full cart more so over the main body of the cart as mentioned, though that also provides a very practical control in dumping and dispensing materials from the cart. Specifically, with the cart resting (on 'all fours" with the wheels and legs on the ground), the scoop retraction releases some materials immediately but enables the operator to control the majority of the dumping by merely lifting the handles slightly to release the majority of the material previously contained within the now retracted scoop, and enables continued tipping of the cart forward to release any or all of the balance of materials very easily. The front edge of the cart, in this example, is only approximately 7 inches long, and at a shallow angle to the cart body floor (so materials slide off and out easily). The handle design (e.g., elongate, continuous, curved, etc.) augments the degree of control, providing the ability to repeatedly or continually adjust or slide one's hands along the handles to maintain balance and control.

As a functional hand truck, the cart can be configured with both a long deck (or toe plate) with the scoop in place, picking up objects with the cart in its vertical position, then rotating to fully balance the load, in most cases, with the ability to fully or nearly eliminate all weight on the user's hands or body, other than that required to propel or rebalance as needed. With the scoop retracted, the cart serves as a hand truck for heavier, denser objects as needed, as the load center of mass might be more easily loaded closer to the axles where it is more efficient to lift (greater gearing). Exemplary embodiments may offer greater lifting power or gearing than standard hand trucks, as the load or weight rests nearly against the cart's axle, whereas in traditional hand truck designs the load is carried in front on the wheels/tires—forcing an undesirable trade-off: larger wheels facilitate easier lifting and transporting but for a traditional hand trucks with 10 inch wheels the load is placed at least 6 inches from the axle (accounting as well for the tubular framing). Also, with the scoop in both configurations, the side walls of the cart help contain and control the load or object from shifting left or right during loading or transport even without a retaining strap.

When the scoop is in its forward position, the top edge of the scoop and the top edge of the rear portion of the cart body might form a mostly straight edge (a fully flat surface from the tip of the scoop to the rear of the cart), which would facilitate carrying flat materials and using flat sheets, such as wood, to form a stable work surface when the wheels and legs are resting on the ground. Further, it permits the addition of a side or corner platform to enable the larger flat surface (formed by the top edges of the body and scoop together) to be used to stabilize a sheet or board by clamping it down against the cart and/or the accessory platform.

In an exemplary embodiment, the scoop may also have one or more releasable locking mechanisms to fix or lock the scoop in its forward position (in the center or on the sides where it meets the top edge(s) of the front half of the main body of the cart). Such catches or locks may be releasable in tandem, or through a remote mechanism (e.g., cable and handle reachable and convenient to operate from behind the cart, etc.) for greater convenience by the operator. For example, a strap might be used to both lift latch and the scoop from its forward position, whereby when the handle is lifted the latch or locking mechanism holding the scoop in place would simultaneously be released. There are a variety of alternative lock and release mechanisms that might be used. In an exemplary embodiment, the cart is configured to enable operation from two or more positions that releases the scoop for rotation or retraction, and then automatically re-latches as the scoop is repositioned to its forward and locked position.

Exemplary embodiments disclosed herein may be configured to (1) increase the cart fill/carrying capacity with a high bow, (2) allow that scoop section to literally scoop or dig up greater amounts of material, then tip the cart to shift the weight farther back, before possibly scooping and filling further (overall to enabling filling more of the overall bin or cart capacity without digging, shoveling, using a pitch fork, etc.), (3) when the scoop is filled, it enables the user's body weight to lift the material to better load and reload materials in the scoop sequentially where with each scoop and tip, some of the material scooped may topple or be shifted rearward in the cart body to more fully fill the cart without digging, lifting or throwing in the typical approach to fill wheelbarrows, and thus avoid the difficulties that otherwise come with a high fixed bow (e.g., less easily emptied, unloaded, or dug from, etc.).

With the scoop in place in front, the scoop's leading edge may generally contact the ground and form a slight attack angle (e.g., 5-7 degrees, etc.). This helps ensure that friction and scraping from the ground impact does not contact and possibly damage the joint where the scoop meets the edge of the cart body. A steeper angle of attack may be used, although the steeper angle may further increase ground friction while scooping a load of material.

In an exemplary embodiment, the legs and handles are formed by a pair of single tubes. The single tube for each handle/leg may connect to the underside of the main cart body although the handles/legs may be constructed and/or attached differently. The shape and position of the handles may incorporate or provide several features or aspects. First, the handles may incorporate a continuous curve from where they contact the ground (in the resting position for the cart) and curve upwards then back toward the front of the cart. This curve allows the operator to selectively adjust hand position to rebalance the cart for lifting, walking, tipping, or operating as a hand truck while still having a comfortable hand position for any rotational position of the cart. Second, the low point on the legs, where the legs contact the ground (again in the cart's rest position) may be configured to allow the full rotation and storage of the scoop mostly behind (and below the cart main body in the scoop's rearward, fully retracted, or stored position). The legs may also act as a stop for the scoop. Third, the separate handles (and tight nesting of the scoop when stored) ensures that the operator also has easy access in that the operator may stand behind the cart between the handles and still comfortably reach the front of the cart, including reaching an exemplary handle or strap to release the latch on the scoop and initiate scoop retraction in an ergonomically favorable body position without excessive leaning/cantilevering. Thus, nearly the entire length of the handle from the tip to where it contacts the ground may be used by the operator in the carts various functions and uses.

In exemplary embodiments, the dynamics of the load handling and effectiveness in handling a variety of materials/objects, performing a range of functions, yet carrying much more material than standard wheelbarrows and being compact (and more so with the cart retracted) is the interrelationships of the design of the main components and how they complement each other in working as a system in various configurations and set ups including: 1) the cart body with the high point at its center where the side wall is tallest (where the scoop attaches); 2) the wedge-shaped scoop that locks into its front position yet rotates on pivots/hinges and retracts; 3) the rearward sloping cart body at rest, and high bow/scoop (nearly vertical when at rest); 4) the leg and handle shapes, which also are designed to keep the cart body sloped rearward when at rest which, as a result, provides a much greater range of motion to rotate the cart and shift its content's center of mass during transport or carrying loads; and 5) the larger sized wheels (vs. wheels of conventional hand trucks and wheelbarrows) which ensure the relative position of the hand truck (as it contacts the ground), and general range of functions from easier rolling, lifting, and rebalancing the weight of the contents in the cart, to greatly, if not mostly or fully, compensating for a wide range of weight distributions (uneven or otherwise without the cart tipping when at rest in its 'four points' position).

In exemplary embodiments, the relatively large wheel size enables the cart to roll more easily over rough terrain or steps, to better enable lifting materials with leveraging using the cart body for lifting and carrying. The wheel size/diameter (relative to the cart geometry) ensures that the hand truck function and the attack angle (relative to the ground) of the scoop and front wall/short hand truck deck are designed to operate efficiently for the various functions and configurations.

In exemplary embodiments, the scoop, when retracted would rotate fully to its stored position, such that no part of the scoop hinders or completely blocks access to the rear of the main cart body (so the tip may be fairly close to the ground).

Such a full rotation of the scoop to its rearward-most rotation also enables the operator to more easily view the cart body when tipping to empty contents or, in a similar position, when operating the cart as a hand truck to pick up heavy objects.

In exemplary embodiments, the handles may be attached to the cart body by passing under the location at which the scoop would be in its stored position. The handles may provide a stop against which the scoop rotation is stopped and rests against when stored. Alternatively, the handles may run along the sides of the main cart body but may then attach farther forward to provide clearance for the scoop rotation.

In exemplary embodiments, the leading edge of the scoop (digging or scooping edge) might extend one or several inches more than the scoop side walls (or the side walls would narrow or taper at the tip). This can facilitate digging into loose materials but also enable large sheet material, such as sheet rock or plywood, to be picked up and rest on that edge or lip prior to tipping and transport on top of the cart (in the scoop forward position).

Exemplary embodiments disclosed herein may have one or more (but not necessarily any or all) of the following features or advantages, such as an ergonomic rotating scoop, continuous ergonomic handles, a configuration designed for balance, extra-large wheels, and/or no separate parts to keep track of, etc. For example, an exemplary embodiment of a cart may include a rotatable scoop that is reconfigurable in seconds for easy loading and unloading and that is self-storable when finished. The cart may also include handles that provide for comfortable hand positions for all body types and sizes. The cart may be configured to allow any user to transport or move relatively heavy loads (e.g., 400 pounds, 520 pounds, 560 pounds, etc.) with stability and ease with minimal or little weight (e.g., with no weight or zero force, etc.) bearing on the user's hands. For example, the cart may allow a user to transport a heavy load three times the user's body weight almost effortlessly. The cart may have a compact design that allows for easy maneuvering and relatively large wheels that enable easier transport over uneven terrain and reduced force needed to rotate a load off the support surface per degree of rotation. By way of example, the cart's wheels may have an outer diameter of at least about 15 inches (e.g., 15 inches, 16 inches, 20 inches, etc.). Also by way of example, the wheels may be configured such that the wheels do not extend above the sidewall of the body when the scoop is in the rearward position and the cart is at rest. Any dimensions (e.g., length, width, height, angles, etc.) provided herein are for purposes of illustration only as the particular dimensions may vary depending on the particular application in which the cart will be used.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances. Whether or not modified by the term "about", the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cart comprising:
  a body, including an upper rim, defining an interior usable for holding materials, the body including a forward portion and a rearward portion;
  a wheel assembly including at least one axle and first and second wheels;
  c-shaped semicircular first and second handles, said first and second handles each forming a continuous handle portion and leg portion, respectively, wherein each handle portion allows a user to move or control the cart and each leg portion is usable for contacting a support surface;
  a scoop rotatable 180 degrees or greater relative to the upper rim and body between a plurality of positions including at least:
    a forward position in which the scoop is disposed adjacent to and overlapping with a portion of the upper rim located on the forward portion of the body, whereby the scoop increases carrying capacity of the cart and provides the cart with a high bow usable for scooping material into the cart; and
    a rearward position in which the scoop is disposed adjacent to and overlapping with another portion of the upper rim located on the rearward portion of the body;
  wherein the scoop engages and rests against each leg portion of the first and second handles when the scoop is in the rearward position.

2. The cart of claim 1, wherein the cart is reconfigurable into a plurality of different configurations including at least:
  a first configuration in which the scoop is in the forward position and the leg portions of the first and second handles are in contact with the support surface;
  a second configuration in which the scoop is in the forward position and in contact with the support surface and the body is upright relative to the support surface;
  a third configuration in which the scoop is in the rearward position and the body is upright relative to the support surface with a front end wall of the body in contact with the support surface; and
  a fourth configuration in which the scoop is in the rearward position and the leg portions of the first and second handles are in contact with the support surface.

3. The cart of claim 1, wherein:
  the body includes first and second opposing sidewalls each including a front sidewall portion, a back sidewall portion, and a middle sidewall portion between and taller than the front and back sidewall portions; and
  the scoop is rotatably coupled to or adjacent the middle sidewall portion of each of the opposite sidewalls of the body.

4. The cart of claim 3, wherein:
  the body further includes a floor, a front end wall, and a shallow back end wall that cooperate with the first and second opposing sidewalls to define the body's interior that is usable for holding materials;

the scoop includes an end portion and opposing sidewall portions that are respectively disposed at least partially over the shallow back end wall and the back sidewall portions of the body when the scoop is in the rearward position; and the end portion and the opposing sidewall portions of the scoop are respectively disposed adjacent the front end wall and the front sidewall portions of the body when the scoop is in the forward position.

5. The cart of claim 4, wherein:
the cart is configured such that when the scoop is in the rearward position, at least a portion of the scoop is below the shallow back end wall of the body and the scoop does not completely block access to the interior of the body; and
a front of the cart when defined by the scoop in the forward position is taller than the front of the cart when defined by the scoop is in the rearward position, whereby the taller front of the cart facilitates scooping, loading, and carrying materials that are also carried in the scoop.

6. The cart of claim 1, wherein:
when the leg portions of the first and second handles are in contact with a horizontal support surface,
the cart is configured such that rotation of the scoop from the forward position towards the rearward position allows materials to be released from the cart generally under the scoop through an opening created between the scoop and the forward portion of the body.

7. The cart of claim 1, wherein when the leg portions and the first and second wheels are in contact with a generally horizontal support surface:
an end portion of the scoop in the forward position is generally or near vertical; and/or a floor of the body slopes downwardly from front to back; and/or
an upper rim of the cart cooperatively defined by the scoop in the forward position and the rearward portion of the body slopes downwardly from front to back.

8. The cart of claim 1, wherein:
the scoop in the forward position and the first and second handles allow the cart to be rebalanced for various load distributions by shifting hand positions along the first and second handles to thereby shift a center of mass of the material carried by the cart and enable rebalancing of a load to reduce force/weight borne by the user and permit lifting and transporting heavier loads; and/or
the body includes a back end wall having a height lower than the scoop in the forward position thereby allowing easier loading and unloading of material to/from the interior of the body overtop the back end wall of the body; and/or
the cart has a generally flat top edge cooperatively defined by a top edge of the rearward portion of the body and a top edge of the scoop in the forward position, wherein the generally flat top edge of the cart allows for carrying a flat material along the generally flat top edge of the cart, whereby positioning of the flat material between the first and second handles may help to contain the flat material therebetween and prevent slippage of the flat material.

9. The cart of claim 1, wherein:
each of the first and second handles comprises a single member coupled to the body that curves upwards from the leg portion then back towards the front of the cart, thereby allowing the user to selectively adjust hand positions by loosening hand grip then sliding hands along the handles without fully releasing the handles to rebalance the cart for lifting, walking, tipping, or operating as a hand truck; and/or the first and second handles are configured to be operable as a stop for the scoop to inhibit rearward rotation of the scoop beyond the rearward position; and/or
the first and second handles are spaced apart such that a front of the cart is accessible to a user standing behind the cart between the first and second handles.

10. The cart of claim 1, wherein:
the cart is configured such that only a small portion of a load carried by the cart will be forward of the axle thereby inhibiting the cart from accidentally tipping over forward when the leg portions of the first and second handles are in contact with a horizontal support surface or when the cart is being rolled along the support surface with a top edge of the cart mostly horizontal; and/or
a width of the cart is greatest along a top edge cooperatively defined by the body and the scoop; and/or
the axle comprises a single axle coupled to the body, the single axle having first and second end portions to which are respectively coupled the first and second wheels; and/or
the cart is configured to allow load rebalancing and changes forward and rearward relative to the axle by reconfiguring the cart into the plurality of different configurations, whereby portions of a load in front of and behind the axle are offsetting and help to counterbalance the load.

11. The cart of claim 1, wherein:
the scoop is detachable from and reattachable to the cart; and/or
the scoop is rotatable about 180 degrees relative to the body between the forward and rearward positions; and/or
the scoop has a generally triangular or wedge shaped side profile; and/or the handle portions of each of the first and second handles are configured to provide a wide range of handle positions and heights for a user of the cart; and/or
the cart is configured such that a center of mass of a load carried by the cart is at about the axle when the cart is level and shifts significantly forward when the cart is rotatable relative to the support surface such that at least a portion of the load is behind the axle, which offsets or counterbalances some of the load; and/or
the first and second handles are configured to provide a user with greater leverage for a given body weight thereby allowing a user to use less overall force to counterbalance a load in transport and to initiate lifting of the load off the support surface with the cart; and/or
the cart is configured such that a weight of the scoop when in the rearward position helps to counterbalance and offset the load and helps to initiate lifting the load off the support surface with the cart.

12. The cart of claim 1, wherein:
the cart is usable as a hand truck having a first length when the scoop is in the forward portion and a second length when the scoop is in the rearward position that is shorter than the first length; and/or
the first and second wheels have an outer diameter of at least about fifteen inches, thereby enabling easier transport over uneven terrain and reduced force needed to rotate a load off the support surface per degree of rotation; and/or
the cart is configured such that when loaded with the scoop in the forward position the load may be transported with the cart generally horizontal and such that the scoop is rotatable from the forward position to the rearward position during transport to allow a stack of materials to be unloaded from the cart as a stack and/or without having to unstack by hand the stack of materials or slide the scoop from underneath an object or stack.

13. The cart of claim 1, wherein:
the cart is configured such that a front wall of the scoop in the forward position is usable for scooping materials into the body of the cart without using hand tools and for transferring at least a portion of the materials towards a back of the cart as the cart is rotated backwardly; and/or
the cart includes means for balancing or rebalancing a load carried by the cart when the load shifts and/or when a portion of the load is unloaded from the cart; and/or the first and second handles are configured such that the leg portions are operable as a stop for the scoop to inhibit rearward rotation of the scoop beyond the rearward position such that the stop point is at a lowest point where the leg portions contact the support surface.

14. The cart of claim 1, wherein:
the cart is configured such that a footprint of the cart is shorter when the scoop is in the rearward position than when the scoop is in the forward position and such that the cart is more maneuverable or easily stored when the cart has the shorter footprint; and/or
the cart further comprises a tool tray slidable relative to the body between an open position and closed position, the tool tray includes an exposed portion for easy-access tool storage, the exposed position is within a footprint of the body and/or all or mostly underneath the overhang of a rear end wall of the body when the tool tray is in the closed position.

15. The cart of claim 1, wherein:
the body includes low front and back end walls for loading and unloading access at a front and a back of the cart when the scoop is in the rearward position; and/or
the scoop includes a generally rectangular end portion and generally triangular opposing sidewall portions; and/or
the scoop in the forward position and the rearward portion of the body cooperatively define generally triangular opposing sidewalls of the cart; and/or
the cart further includes a latching mechanism for releasably coupling the scoop in the forward position to the forward portion of the body, the latching mechanism including first and second side latches along opposite sides of the cart and a connecting member between the first and second side latches that enables the latching mechanism to be unlatched or latched by either one of the first and second side latches; and/or
the cart further includes a wood rack positionable within an interior of the cart cooperatively defined by the body and the scoop in the forward position, the wood rack including a curved outer wall having a curvature corresponding to a rotational path of a front edge of the scoop between the forward and rearward positions.

16. The cart of claim 1, wherein:
the cart is configured such that an attack angle of a front end wall of the body is steeper than an attack angle of the scoop, wherein
a rotatable joint between the scoop and the body does not contact the support surface when the scoop is in the forward position and also in contact with the support surface.

* * * * *